United States Patent
Laucius et al.

(10) Patent No.: US 10,063,548 B1
(45) Date of Patent: *Aug. 28, 2018

(54) SYSTEM, METHOD, AND PROGRAM PRODUCT FOR PROCESSING SECURE TRANSACTIONS WITHIN A CLOUD COMPUTING SYSTEM

(71) Applicant: Winklevoss IP, LLC, Wilmington, DE (US)

(72) Inventors: Andrew Laucius, Brooklyn, NY (US); Cem Paya, San Francisco, CA (US); Eric Winer, New York, NY (US)

(73) Assignee: Winklevoss IP, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/906,898

(22) Filed: Feb. 27, 2018

Related U.S. Application Data

(63) Continuation of application No. 15/818,134, filed on Nov. 20, 2017, now Pat. No. 9,942,231, which is a continuation of application No. 15/006,971, filed on Jan. 26, 2016, now Pat. No. 9,853,977.

(60) Provisional application No. 62/107,726, filed on Jan. 26, 2015.

(51) Int. Cl.
*H04L 29/06* (2006.01)
*H04L 9/32* (2006.01)
*H04L 9/06* (2006.01)

(52) U.S. Cl.
CPC .......... *H04L 63/0884* (2013.01); *H04L 9/321* (2013.01); *H04L 9/3242* (2013.01); *H04L 9/3247* (2013.01); *H04L 63/0815* (2013.01); *H04L 63/123* (2013.01); *H04L 9/0637* (2013.01)

(58) Field of Classification Search
CPC .......................... H04L 63/0815; H04L 9/0637
See application file for complete search history.

(56) References Cited

U.S. PATENT DOCUMENTS

| | | | |
|---|---|---|---|
| 9,276,740 | B2 | 3/2016 | Nix |
| 9,288,059 | B2 | 3/2016 | Nix |
| 9,350,550 | B2 | 5/2016 | Nix |
| 9,641,327 | B2 | 5/2017 | Nix |

(Continued)

*Primary Examiner* — Thaddeus J Plecha
(74) *Attorney, Agent, or Firm* — Amster Rothstein and Ebenstein

(57) ABSTRACT

Particular systems, methods, and program products for web-based security systems for user authentication and processing in a distributed computing environment are disclosed. A computing sub-system may receive an electronic processing request and a first signed data packet having a first payload that was hashed and encrypted using a first private key. The first payload may comprise first processing output and a first timestamp. The sub-system may verify the first signed data packet by decrypting it using a first public key. The sub-system may execute computing operations to satisfy the electronic processing request, producing second processing output. The sub-system may configure a data packet with a second payload comprising at least the second processing output and a second timestamp. The sub-system may encrypt the second payload using a second private key producing a second signed data packet. The sub-system may transmit to a second sub-system the second signed data packet.

8 Claims, 15 Drawing Sheets

(56) References Cited

U.S. PATENT DOCUMENTS

| | | |
|---|---|---|
| 9,698,981 B2 | 7/2017 | Nix |
| 2004/0098609 A1 | 5/2004 | Bracewell et al. |
| 2004/0260949 A1 | 12/2004 | Aoki et al. |
| 2006/0218625 A1* | 9/2006 | Pearson ............. H04L 63/0428 726/4 |
| 2008/0159318 A1 | 7/2008 | Pierlot et al. |
| 2010/0146290 A1 | 6/2010 | Bachmann et al. |
| 2011/0302412 A1 | 12/2011 | Deng et al. |
| 2014/0379428 A1* | 12/2014 | Phansalkar ........ G06Q 30/0202 705/7.32 |
| 2015/0188906 A1* | 7/2015 | Minov ................ H04L 63/0815 726/8 |
| 2015/0296379 A1 | 10/2015 | Nix |
| 2016/0134616 A1* | 5/2016 | Koushik ............. H04L 63/0807 726/9 |
| 2016/0164678 A1 | 6/2016 | Nix |
| 2016/0269386 A1 | 9/2016 | Nix |
| 2017/0188231 A1 | 6/2017 | Nix |
| 2017/0237561 A1 | 8/2017 | Nix |
| 2017/0302447 A1 | 10/2017 | Nix |
| 2017/0373845 A1 | 12/2017 | Nix |

\* cited by examiner

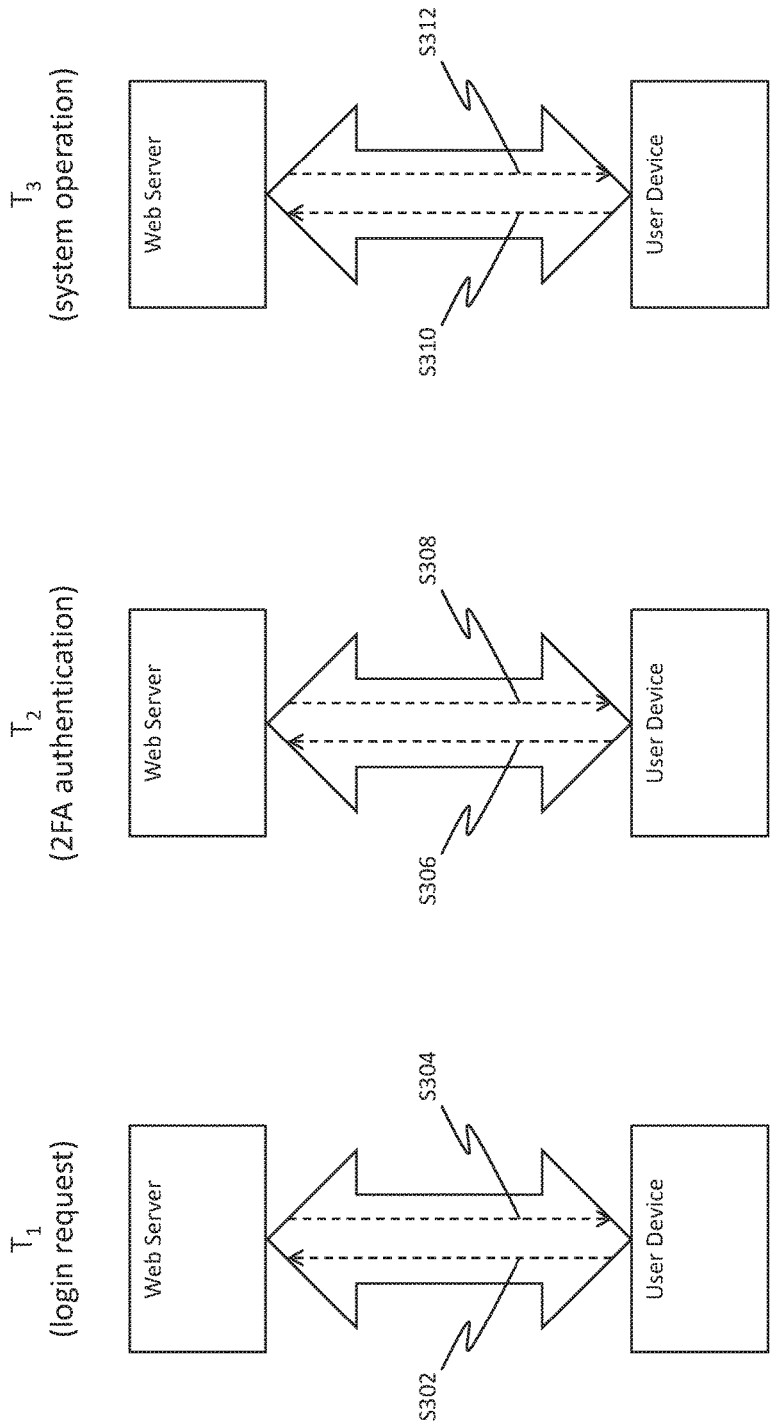

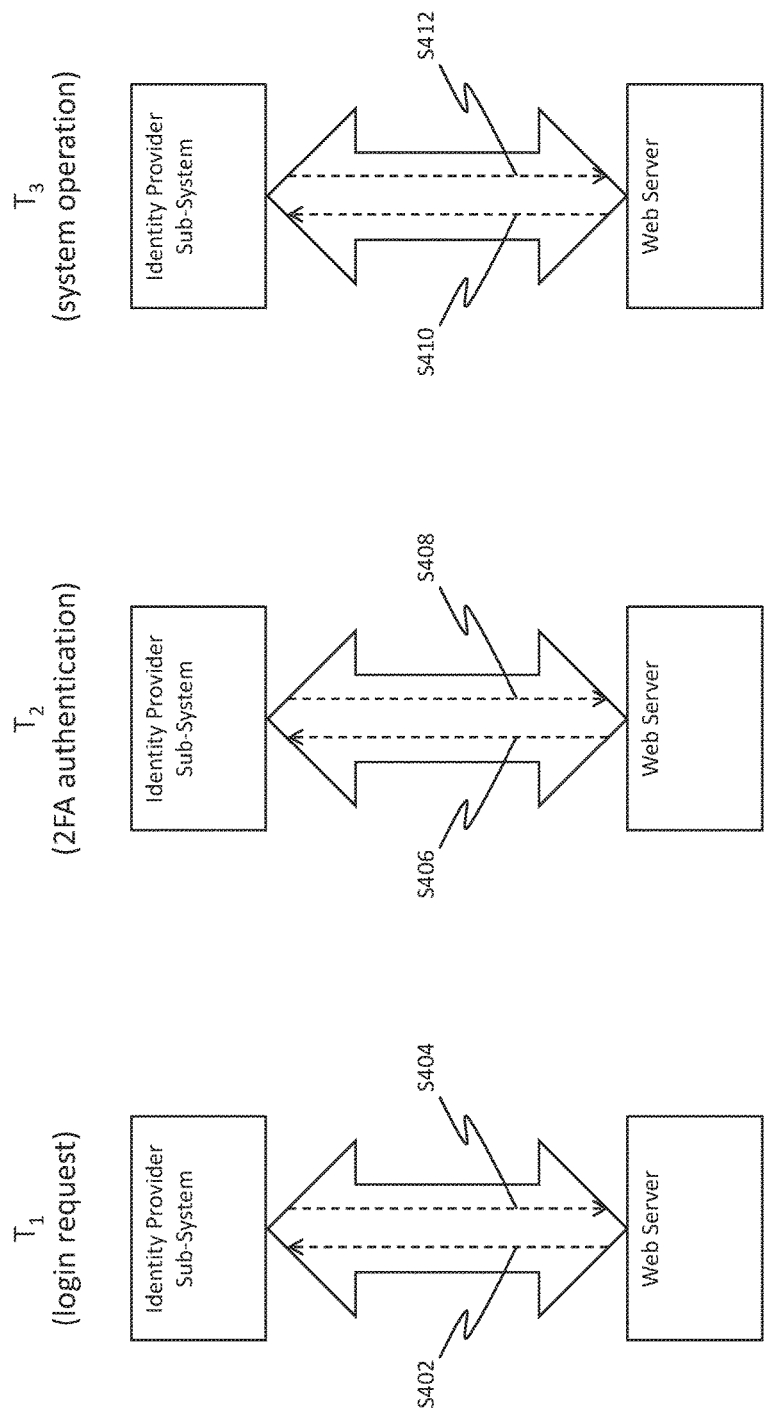

SYSTEM, METHOD, AND PROGRAM PRODUCT FOR PROCESSING SECURE TRANSACTIONS WITHIN A CLOUD COMPUTING SYSTEM

CROSS-REFERENCE TO RELATED APPLICATIONS

The present application is a continuation of U.S. patent application Ser. No. 15/818,134, entitled "SYSTEM, METHOD, AND PROGRAM PRODUCT FOR PROCESSING SECURE TRANSACTIONS WITHIN A CLOUD COMPUTING SYSTEM," filed on Nov. 20, 2017, which is a continuation of U.S. patent application Ser. No. 15/006,971, entitled "SYSTEM, METHOD, AND PROGRAM PRODUCT FOR PROCESSING SECURE TRANSACTIONS WITHIN A CLOUD COMPUTING SYSTEM," filed on Jan. 26, 2016, now U.S. Pat. No. 9,853,977, which in turn claims the benefit of and priority to U.S. Provisional Patent Application Ser. No. 62/107,726, entitled "SYSTEM, METHOD, AND PROGRAM PRODUCT FOR PROCESSING SECURE TRANSACTIONS WITHIN A CLOUD COMPUTING SYSTEM," filed on Jan. 26, 2015, and the contents of these applications are incorporated herein by reference in their entirety.

FIELD OF INVENTION

The present invention generally relates to particular systems, methods, and program products for web-based security systems for user authentication and processing in a distributed computing environment.

SUMMARY OF INVENTION

Particular systems, methods, and program products for web-based security for user authentication and processing in a distributed computing environment are disclosed.

In embodiments, user authentication processes may entail generation and transmission of an identity provider data packet to track user access authorization in a distributed computing system.

In embodiments, a secure data packet provided by an identity provider sub-system may be passed throughout a distributed computing system to provide information, such as user authentication information to various system components or sub-systems. In embodiments, such a secure data packet may comprise an HTTP cookie or web cookie, which may be encrypted.

In embodiments, a verification data packet, generated and/or modified by one or more processing sub-systems, may be passed among sub-systems to certify the authenticity of data, including electronic requests, received from other sub-systems of a distributed computing system.

In embodiments, a method of authenticating a user and/or a user session may comprise receiving, at a web server of a computing system from a user device, an electronic login request comprising user credentials; transmitting, from the web server to an identity provider sub-system of the computing system, the user credentials for verification based at least in part upon reference user credentials stored in non-transitory computer-readable memory, wherein the identity provider is configured to authenticate user sessions; receiving, at the web server from the identity provider sub-system, a first signed identity provider data packet having a first payload comprising first login credential verification information, a first timestamp, a session identifier, and a first identity provider sub-system digital signature, wherein the first signed identity provider data packet provides an indication that the user session is authenticated and wherein the first identity provider sub-system digital signature is generated by generating a hash of the first payload and encrypting the hash using a first identity provider sub-system private key; generating, by the web server, first display data; transmitting, from the web server to the user device, the first signed identity provider data packet; and transmitting, from the web server to the user device, the first display data.

The method may further comprise receiving, at the web server from the user device, the first signed identity provider data packet; receiving, at the web server from the user device, a user data packet requiring processing by the computing system; transmitting, from the web server to a processing sub-system of the computing system, an electronic request for processing based at least in part upon the user data packet; transmitting, from the web server to a processing sub-system, the first signed identity provider data packet so that the processing sub-system can verify that the user session is authenticated; receiving, at the web server from the processing sub-system, first processed data; transmitting, from the web server to the identity provider sub-system, the first signed identity provider data packet along with an electronic request to update the first signed identity provider data packet; receiving, at the web server from the identity provider sub-system, a second signed identity provider data packet having a second payload comprising the first login credential verification information, a second timestamp, the session identifier, and a second identity provider sub-system digital signature, wherein the second signed identity provider data packet provides an updated indication that the user session remains authenticated and wherein the second identity provider sub-system digital signature is generated by generating a hash of the second payload and encrypting the hash using the first identity provider sub-system private key; generating, by the web server, second display data based at least in part upon the first processed data; transmitting, from the web server to the user device, the second signed identity provider data packet; and transmitting, from the web server to the user device, the second display data.

In embodiments, the first signed identity provider data packet may be an HTTP cookie. In embodiments, the first signed identity provider data packet may be encrypted prior to transmission to the user device and/or may be transmitted via an encrypted communication.

In embodiments, the method may further comprise, after receiving the first signed identity provider data packet, the step of verifying, by the web server, the authenticity of the first signed identity provider data packet by decrypting the first signed identity provider data packet using a public key corresponding via asymmetric key cryptography to the identity provider sub-system private key.

In embodiments, the first signed identity provider data packet may be used by the processing sub-system to verify that the user session is authenticated by determining that the user credentials were authenticated and determining, based at least in part upon the first timestamp, that the user session has not timed out.

In embodiments, the first display data may comprise machine-readable instructions to render a graphical user interface for inputting user multi-factor authentication data. In embodiments, the method may further comprise, e.g., prior to receiving a user data packet requiring processing by the computing system, the steps of receiving, at the web server from the user device, user multi-factor authentication data and the first signed identity provider data packet; transmitting, from the web server to the identity provider sub-system, the user multi-factor authentication data; receiving, at the web server from the identity provider sub-system, a third signed identity provider data packet comprising second login credential verification information including multi-factor authentication information, a third timestamp, the session identifier, and a third identity provider sub-system digital signature; generating, by the web server, third display data; transmitting, from the web server to the user device, the third signed identity provider data packet; and transmitting, from the web server to the user device, the third display data.

In embodiments, a method of authenticated computing may comprise receiving, at a first sub-system of a computing system from an origination sub-system, at least a first portion of a first electronic processing request; executing, by the first sub-system, first computing operations to satisfy the first portion of the first electronic processing request to generate a first sub-processing output; configuring, by the first sub-system, a first processing verification data packet comprising a first payload comprising a first timestamp and the first sub-processing output; generating, by the first sub-system, a signed first processing verification data packet by generating a hash of the first payload and encrypting the hash using a first sub-system private key; generating, by the first sub-system, a second electronic processing request associated with a second portion of the first electronic processing request; and transmitting, from the first sub-system to a second sub-system of the computing system, the second electronic processing request along with the signed first processing verification data packet.

The method may further comprise verifying, by the second sub-system, the authenticity of the signed first processing verification data packet by decrypting the signed first processing verification data packet using a public key corresponding via asymmetric key cryptography to the first sub-system private key; executing, by the second sub-system, second computing operations to satisfy the second electronic processing request to generate a second sub-processing output; configuring, by the second sub-system, a second processing verification data packet comprising a second payload comprising a second timestamp, the first sub-processing output, and the second sub-processing output; generating, by the second sub-system, a signed second processing verification data packet by generating a hash of the second payload and encrypting the hash using a second sub-system private key; and transmitting, from the second sub-system to a third sub-system of the computing system, the signed second processing verification data packet.

In embodiments, the origination sub-system may be a web server. In embodiments, the third sub-system may be the origination sub-system.

In embodiments, receiving at least a first portion of a first electronic processing request may further comprise receiving a first signed identity provider data packet, digitally signed using an identify provider private key by an identity provider sub-system that authenticated the user session. In embodiments, the method may further comprise verifying, by the first sub-system, the authenticity of the first signed identity provider data packet by decrypting the first signed identity provider data packet using a public key corresponding via asymmetric key cryptography to the identity provider private key.

In embodiments, the signed second processing verification data packet may comprise respective digital signatures of the first sub-system and the second sub-system. In embodiments, digital signatures from a plurality of sub-systems that processed some of the data in a data packet payload may be appended to that data packet. In embodiments, digital signatures may comprise alphanumeric sequences generated using a respective private key.

In embodiments, a computing system may comprise a web server comprising one or more computers; an identity provider sub-system; and non-transitory computer-readable memory comprising one or more memory devices, e.g., operatively connected to the web server and to the identity provider sub-system, wherein the system is programmed to authenticate users by: receiving, at a web server of the computing system from a user device, an electronic login request comprising user credentials; transmitting, from the web server to an identity provider sub-system of the computing system, the user credentials for verification based at least in part upon reference user credentials stored in non-transitory computer-readable memory, wherein the identity provider is configured to authenticate user sessions; receiving, at the web server from the identity provider sub-system, a first signed identity provider data packet having a first payload comprising first login credential verification information, a first timestamp, a session identifier, and a first identity provider sub-system digital signature, wherein the first signed identity provider data packet provides an indication that the user session is authenticated and wherein the first identity provider sub-system digital signature is generated by generating a hash of the first payload and encrypting the hash using a first identity provider sub-system private key; generating, by the web server, first display data; transmitting, from the web server to the user device, the first signed identity provider data packet; and transmitting, from the web server to the user device, the first display data.

The system may further be programmed to perform the steps of receiving, at the web server from the user device, the first signed identity provider data packet; receiving, at the web server from the user device, a user data packet requiring processing by the computing system; transmitting, from the web server to a processing sub-system of the computing system, an electronic request for processing based at least in part upon the user data packet; transmitting, from the web server to a processing sub-system, the first signed identity provider data packet so that the processing sub-system can verify that the user session is authenticated; receiving, at the web server from the processing sub-system, first processed data; transmitting, from the web server to the identity provider sub-system, the first signed identity provider data packet along with an electronic request to update the first signed identity provider data packet; receiving, at the web server from the identity provider sub-system, a second signed identity provider data packet having a second payload comprising the first login credential verification information, a second timestamp, the session identifier, and a second identity provider sub-system digital signature, wherein the second signed identity provider data packet provides an updated indication that the user session remains authenticated and wherein the second identity provider sub-system digital signature is generated by generating a hash of the second payload and encrypting the hash using the first identity provider sub-system private key; generating, by the web server, second display data based at least in part upon the first processed data; transmitting, from the web server to the user device, the second signed identity provider data packet; and transmitting, from the web server to the user device, the second display data.

In embodiments, a computing system may comprise one or more processors and non-transitory computer-readable memory having stored thereon instructions to perform the steps of receiving, at a first sub-system of the computing system from an origination sub-system, at least a first portion of a first electronic processing request; executing, by the first sub-system, first computing operations to satisfy the first portion of the first electronic processing request to generate a first sub-processing output; configuring, by the first sub-system, a first processing verification data packet comprising a first payload comprising a first timestamp and the first sub-processing output; generating, by the first sub-system, a signed first processing verification data packet by generating a hash of the first payload and encrypting the hash using a first sub-system private key; generating, by the first sub-system, a second electronic processing request associated with a second portion of the first electronic processing request; and transmitting, from the first sub-system to a second sub-system of the computing system, the second electronic processing request along with the signed first processing verification data packet.

The computer-readable memory may further have stored thereon instructions to perform the steps of verifying, by the second sub-system, the authenticity of the signed first processing verification data packet by decrypting the signed first processing verification data packet using a public key corresponding via asymmetric key cryptography to the first sub-system private key; executing, by the second sub-system, second computing operations to satisfy the second electronic processing request to generate a second sub-processing output; configuring, by the second sub-system, a second processing verification data packet comprising a second payload comprising a second timestamp, the first sub-processing output, and the second sub-processing output; generating, by the second sub-system, a signed second processing verification data packet by generating a hash of the second payload and encrypting the hash using a second sub-system private key; and transmitting, from the second sub-system to a third sub-system of the computing system, the signed second processing verification data packet.

In embodiments, program products may be provided to facilitate the secure authentication operations of the present invention. Accordingly, software and/or software libraries, may be provided for implementation in computing systems, such as distributed computing systems, to perform the processes described herein.

BRIEF DESCRIPTION OF THE DRAWINGS

Exemplary embodiments of the present invention will be described with references to the accompanying figures, wherein:

FIGS. 3A-C are schematic diagrams of communications between an electronic user device and a web server in accordance with exemplary embodiments of the present invention;

FIGS. 4A-C are schematic diagrams of communications between a web server and an identity provider sub-system in accordance with exemplary embodiments of the present invention;

DETAILED DESCRIPTION OF THE INVENTION

The present invention generally relates to particular systems, methods, and program products for web-based security for user authentication and processing in a distributed computing environment.

The present invention is an improvement to computer security technology. Computer systems to date have been susceptible to attack, whether the introduction of malicious code or the unauthorized access of information, over external data connections, such as the Internet. As computing systems increasingly move to distributed computing architectures, such as cloud computing, external data connections are often necessary to the functioning of the computing system. However, those same external data connections provide opportunity for attack. The present invention provides novel systems, methods, and program products to provide security in computing systems. The present invention can provide verification that a user is authorized or that a user session is authorized, such as having valid user credentials and the session not having timed out. The authenticity of any client request received from a user device, or configured to appear as if it originated from a user device, can be confirmed by the computing system. In other embodiments, communications among sub-systems of a computing system can be verified using the trust chain verified computing methods of the present invention.

A secure data packet may be passed throughout a distributed computing system to provide information, such as authentication information to various system components or sub-systems. In embodiments, such a secure data packet may comprise an HTTP cookie or web cookie, which may be encrypted. Cookies may be persistent client state objects with a unique identifier. In embodiments, the data packet itself may not be encrypted, but may be transmitted using secure transmission such as a Secure Sockets Layer (SSL). The secure data packet may be secured using public key cryptography, also known as asymmetric cryptography. Accordingly, one or more computing systems or sub-systems may sign the data packet using a private key. Other computing systems or sub-systems may verify the signature using a public key to authenticate the data packet, as described herein. In embodiments, the public key may be transmitted along with a signed data packet.

Figure 1A:
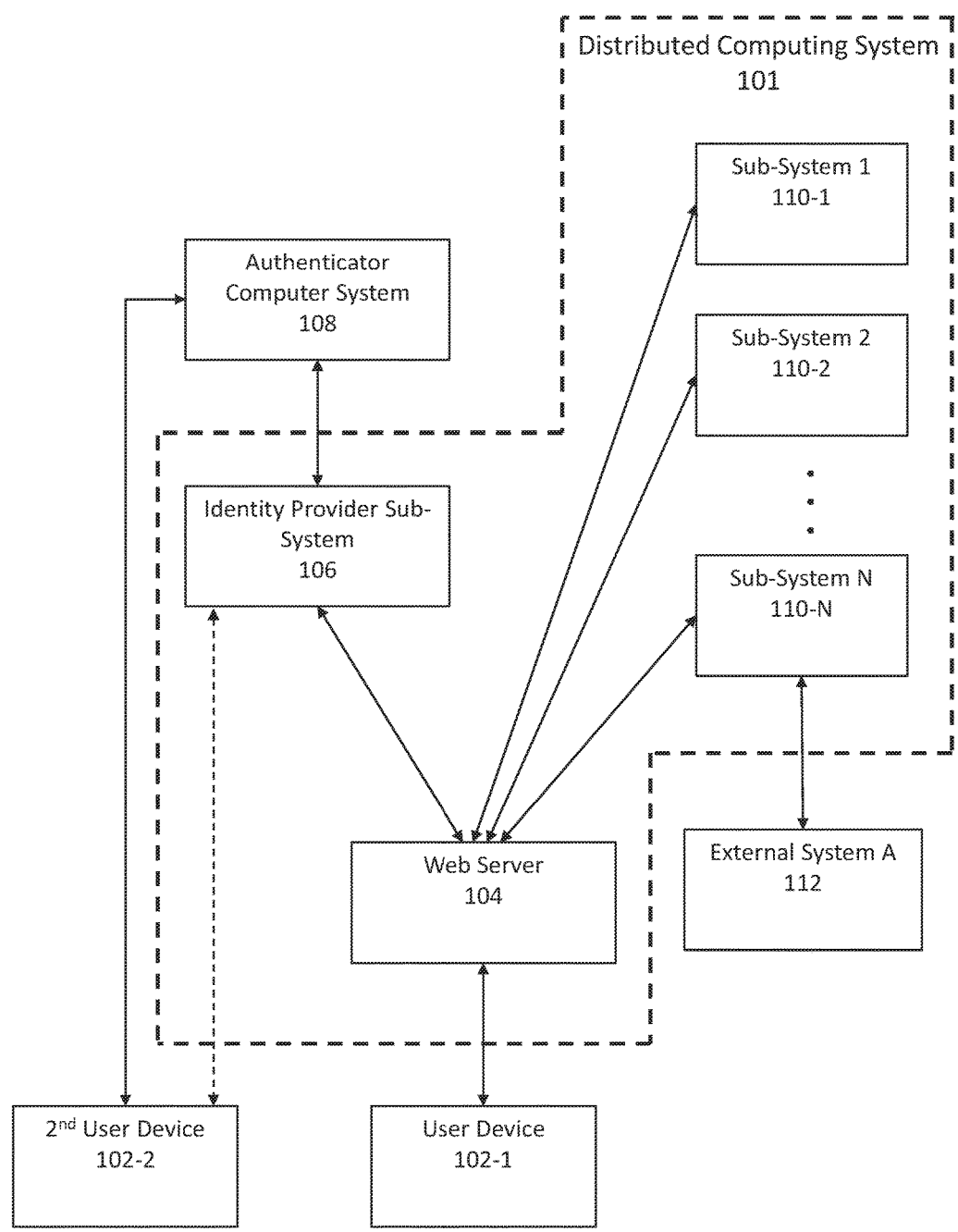
FIGS. 1A-C are schematic diagrams of system components in accordance with exemplary embodiments of the present invention.

FIG. 1A illustrates components in a system for secure, authenticated distributed computing. Such a system can include a distributed computing system 101, which in turn can include a web server 104, an identity provider subsystem 106, and/or one or more sub-systems 110 (e.g., sub-system 1 110-1, sub-system 2 110-2, . . . , sub-system N 110-N), which may be processing sub-systems configured to perform one or more computing processes. In embodiments, the distributed computing system 101 may include an authenticator sub-system. In other embodiments, authentication functions may be performed by a separate computer system, as described herein with respect to an authenticator computer system 108.

The distributed computing system 101 may be operatively connected to a user device 102-1. In embodiments, the distributed computing system 101 may connect to one or more user devices 102. In embodiments, the web server 104 or another data server may handle communications between the distributed computing system 101 and the user device 102. In embodiments, the distributed computing system 101 may be operatively connected to the authenticator computer system 108, which may be a third-party computer system, as shown in FIG. 1A. For convenience, the authenticator computer system 108 and the authenticator sub-system are described herein with respect to the authenticator computer system 108, although either component may perform the processes described herein. The authenticator computer system 108 may be operatively connected to a second user device 102-2, where both the user device 102-1 and the second user device 102-2 may be associated with a single user and/or user account or groups of accounts (e.g., a master account with sub-accounts for individual users). In embodiments, the first user device 102-1 and the second user device 102-2 may be the same physical device accessing different user accounts or using different communications technology, such as accessing the web server through web-based HTTP requests on one hand and on the other hand communicating with the authenticator computer system 108 via text message (SMS) or cellular phone call, to name a few. The distributed computing system 101 may also communicate with one or more external systems 112, which may be computer systems comprising one or more computers. In embodiments, a sub-system 110 may be operatively connected to an external system 112, e.g., to obtain data (e.g., receive data and/or fetch data) and/or to transmit data.

The components in a system for secure, authenticated distributed computing may comprise one or more computers. The components may have one or more processors and non-transitory computer-readable memory, such as external and/or internal hard drives and/or disk drives. The components may further include data stored in one or more databases in the non-transitory computer-readable memory and one or more software modules stored in the non-transitory computer-readable memory and running or configured to run on the one or more processors. The components may include input devices (e.g., keyboards, mice, touchscreens, microphones, cameras) and/or output devices (e.g., display devices, speakers).

The components of a system for secure, authenticated distributed computing may be operatively connected directly, such as via wired or wireless communications, and/or indirectly, such as via a data network, such as the Internet, a telephone network, a mobile broadband network (e.g., a cellular data network), a mesh network, a local area network (LAN) (including a wireless local area network, e.g., a Wi-Fi network), a wide area network (WAN), a metropolitan area network (MAN), and/or a global area network (GAN), to name a few. Data networks may be provided via wired and/or wireless connections. In embodiments, any combination of communications channels may be utilized by the system components. The system components may each include one or more communications portals, which may handle, process, support, and/or perform wired and/or wireless communications, such as transmitting and/or receiving data (e.g., data packets). In embodiments, transmission described with respect to a single data packet may comprise a plurality of data packets. Data packets may be discrete electronic units of data. In other embodiments, transmissions may comprise non-discrete signals, such as data streams. Transmissions described with respect to data packets may also comprise data transmissions via other communications mechanisms known in the art, such as data streams. Communications portals can comprise hardware (e.g., hardware for wired and/or wireless connections, such as communications chipsets, communications interfaces, and/or communications antennas, to name a few) and/or software.

Wired connections may be adapted for use with cable, plain old telephone service (POTS) (telephone), fiber (such as Hybrid Fiber Coaxial), xDSL, to name a few, and wired connections may use coaxial cable, fiber, copper wire (such as twisted pair copper wire), and/or combinations thereof, to name a few. Wired connections may be provided through telephone ports, Ethernet ports, USB ports, and/or other data ports, such as Apple 30-pin connector ports or Apple Lightning connector ports, to name a few. Wireless connections may include cellular or cellular data connections and protocols (e.g., digital cellular, PCS, CDPD, GPRS, EDGE, CDMA2000, 1×RTT, Ev-DO, HSPA, UMTS, 3G, 4G, and/or LTE, to name a few), Bluetooth, Bluetooth Low Energy, Wi-Fi, radio, satellite, infrared connections, ZigBee communication protocols, to name a few. Communications interface hardware and/or software, which may be used to communicate over wired and/or wireless connections, may comprise Ethernet interfaces (e.g., supporting a TCP/IP stack), X.25 interfaces, T1 interfaces, and/or antennas, to name a few.

Referring to the exemplary distributed computing system 101, the functions described herein with respect to each sub-system may be performed by one or more other sub-systems. Each sub-system may be separate computer system comprising one or more computers. In embodiments, one or more sub-systems may share any of the same hardware (e.g., the same processors, computer-readable memory, and/or communications portals, to name a few). Accordingly, while described herein with respect to distributed cloud computing architectures, the security systems of the present invention may be implemented by a single computer having multiple logical components (e.g., one or more software modules for performing various computing processes, an identity provider module, to name a few) and/or multiple memory components (e.g., a plurality of computer-readable memory devices or a plurality of databases stored on computer-readable memory). In other embodiments, the security systems of the present invention may be implemented by a network of directly connected computers. Security may be maintained so long as a cryptographic private key of each sub-system remains uncompromised. In other embodiments, sub-systems may be distributed in a cloud computing architecture, which may utilize one or more servers. Each sub-system or each module may be operatively connected to non-transitory computer-readable memory having stored thereon machine-readable processing instructions for the respective sub-system or module. In embodiments, such memory may be different computer-readable memory. In other embodiments, the memory may be the same, e.g., stored on the same one or more memory devices, which may be accessed at a common address. In embodiments, the computer-readable memory may further have stored thereon one or more databases containing data pertaining to the system (e.g., data obtained by the system (transmitted to, uploaded to, received by and/or fetched by, to name a few) and/or data generated by the system).

The web server 104 may provide display data to one or more user device 102, e.g., user device 102-1. Display data may comprise website content (e.g., HTML, JavaScript, and/or other data from which a user device can generate and/or render one or more webpages) and/or application content, such as mobile application content, to be used in generating or providing display content for one or more software applications (e.g., an installed application such as executable software or mobile apps configured to generate viewer interfaces). In embodiments, a web browser configured to render web pages may render one or more interfaces, such as graphical user interfaces, based upon the display data. In embodiments, the web server 104 may authenticate a user account by verifying received user credentials, such as a received username and password combination. The web server 104 may transmit data packets such as HTTP or web cookies to user devices 102. Such a data packet may be an identity provider (IDP) data packet, which may contain security data comprising user verification information, such as login credential verification information, 2-factor authentication verification information, session duration information, to name a few. In embodiments, the web server 104 may generate an IDP web cookie from an IDP data packet. The web server 104 may receive data from the user devices 102, such as electronic requests, user input data, and/or an IDP data packet that was transmitted to and stored by the user device 102.

The identity provider sub-system 106 may comprise one or more computers. It may verify user credentials, verify that a user session has not expired (e.g., that a predefined session duration or threshold period of inactivity has not been exceeded), verify that a request originated from an authorized user (e.g., an authorized and individual user whose identity has been verified, an authorized user account having valid credentials, and/or an authorized user device, which may be a pre-registered device), and/or may provide such verifications to other system components. Accordingly, the identity provider sub-system 106 may generate and/or update a secure data packet (an IDP data packet or authorization data packet) comprising a payload of authorization information. In embodiments, such a data packet may be a web cookie. The identity provider sub-system 106 may sign the payload of the data packet using an identity provider private key in order to secure the data packet using public key cryptography. Other system components may use a corresponding public key to verify the signature of the identity provider sub-system 106 and/or to read the data packet payload. The other system components may be programmed to verify the IDP data packet before processing requests originating from a user or user device.

In embodiments, the identity provider sub-system 106 may perform authentication processes as described herein with respect to the authenticator computer system 108. The authenticator computer system 108 may authenticate a user's identity, e.g., using multi-factor authentication such as two-factor authentication (2FA), as is known in the art. For example, the authenticator computer system 108 may receive an electronic second authentication request from a distributed computing system 101 and/or from the web-server 104 or the identity provider sub-system 106, e.g., following a login request, such as submission of a username (e.g., a unique alphanumeric identifier or an email address, to name a few) and password, from a first user device 102-1. The electronic second authentication request may comprise a user identification, such as a user account identifier (e.g., an alphanumeric text string). In embodiments, the electronic second authentication request may comprise time information indicating a time of the request. In embodiments, the authenticator computer system 108 may generate a token, which may be an alphanumeric text string, and transmit the token to a second user device 102-2. The token may be input and/or transmitted from the first user device 102-1 to the web server 104, which may confirm the validity of the token. In embodiments, a different sub-system of the distributed computing system 101 may confirm the validity of the token, which may entail transmitting the received token to the authenticator computer system 108 and receiving an electronic indication of token validity. Accordingly, the authenticator computer system 108 may determine token validity.

In embodiments, a token may be generated at a user device instead of generated remotely and transmitted to a second user device. Accordingly, both the authenticator computer system 108 and the user device 102-1 may store a secret seed, from which the authenticator computer system 108 and the user device 102-1 can generate a token, e.g., using a Time-based One-time Password algorithm (TOTP), which can generate tokens based on the secret seed and current time. Such a token may be transmitted from the first user device 102-1 to the web server 104 for verification (either by the web server 104, another sub-system, or the authenticator computer system 108) instead of requiring a second user device 102-2 to receive and then transmit a token. In embodiments, the authenticator computer system 108 may store a public key associated with a user private key, where the public and private keys (e.g., RSA keys) may comprise a cryptographic key pair for public key cryptography. The user private key may be stored on the user device 102-1. The keys may be used to encrypt transfers of a secret seed, e.g., to provide a user device 102-1 with a new secret seed. In other embodiments, a physical device may be programmed to generate a token for the user device 102-1 to provide to the web server 104.

User devices 102 may be computers, tablet computers, wearable computers, mobile phones, smart phones, PDAs, remote controls, or other user electronic devices configured to receive, display, and/or transmit data. User devices 102 may be associated with phone numbers (e.g., capable of receiving SMS messages). In embodiments, user devices 102 may be configured to receive email for a user email account. In embodiments, user devices 102 may include a web browser, mobile application, downloadable desktop application, and/or other program product for communicating via a data network such as the Internet and/or communicating with a web server 104. User devices may generate and/or update one or more graphical user interfaces with display content received from a server. Such display content may be based upon machine-readable instructions received from the server that may comprise display content data, action handling instructions, layout instructions, and/or other styling instructions, to name a few.

An external system 112 may be a computer system that communicates with a distributed computing system 101 to provide or obtain information.

Figure 1B:
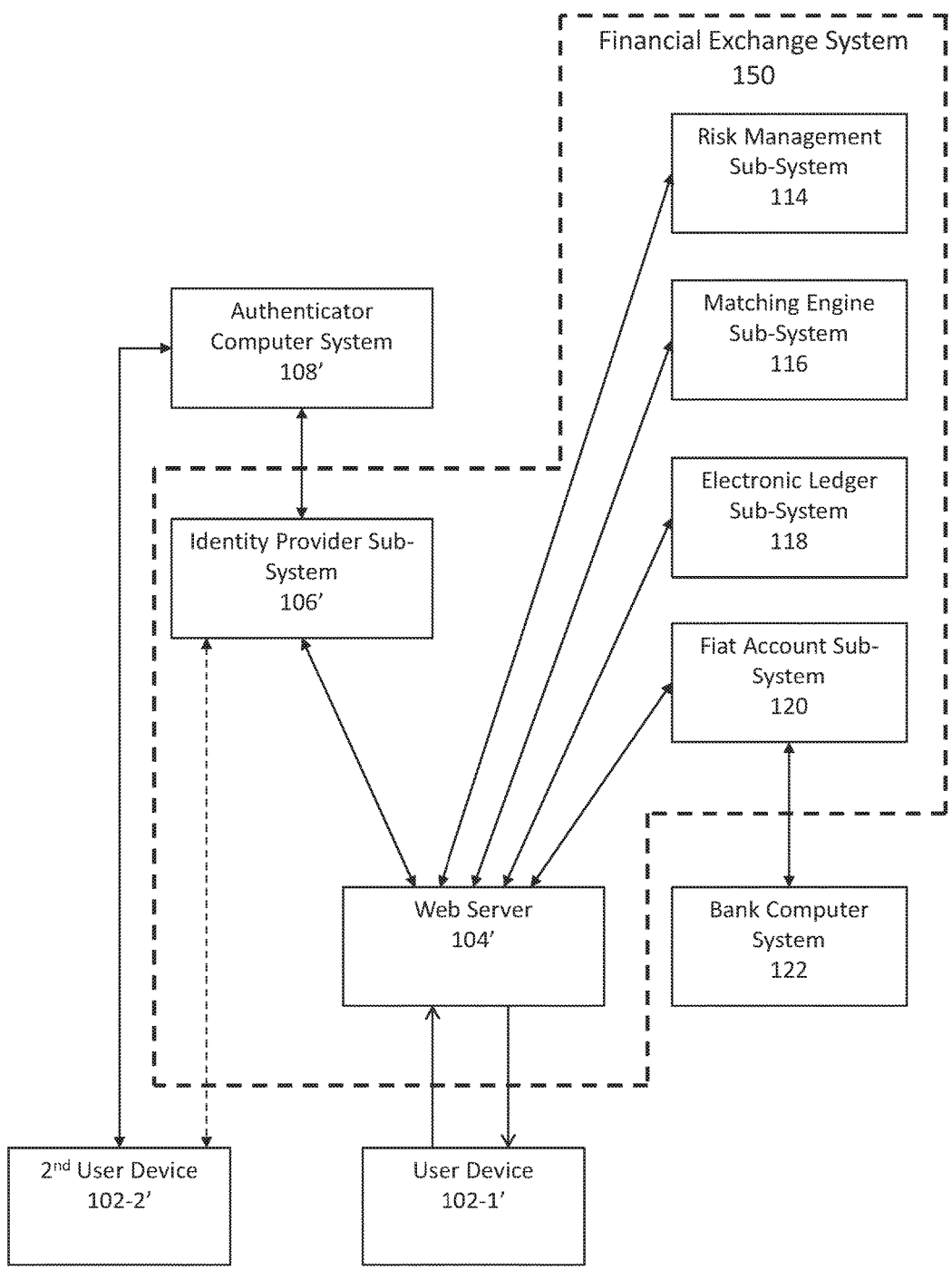

FIG. 1B illustrates components for secure, authenticated distributed computing in an exemplary financial exchange system. The system components can include the hardware and/or software described with respect to FIG. 1A. Also as described with respect to FIG. 1A, the system can include a web server 104', an identity provider sub-system 106', an authenticator computer system 108', and/or one or more user devices (e.g., 102-1, 102-2), which user devices may be computer systems (e.g., institutional investor computer systems). A distributed financial exchange computer system 150 can include the web server 104', identity provider sub-system 106', and one or more processing sub-systems, such as a risk management sub-system 114, a matching engine sub-system 116, and electronic ledger sub-system 118, and/or a fiat account sub-system 120. The financial exchange computer system 150 may communicate with one or more external computer systems, such as bank computer systems 122 and/or index computer systems.

A risk management sub-system 114 may perform processes to detect fraudulent transactions and/or security breaches. Such a sub-system may monitor access data describing access of the exchange (e.g., IP addresses, accounts, times of access, to name a few), monitor trading data, analyze trading data, determine patterns, determine anomalies, and/or determine violations of pre-programmed security rules, to name a few. A matching engine sub-system 116 may match buy orders with sell orders, receive orders, and/or update an electronic order book, to name a few. An electronic ledger sub-system 118 may track and/or store account balances, update account balances, compute account balances, report account balances, and/or place holds on account funds while transactions are in progress (e.g., set an account hold indicator), to name a few. A fiat account sub-system 120 may allocate funds among accounts, track funds, store funds, and/or transfer funds, to name a few. The fiat account sub-system 120 may manage omnibus or pooled accounts for holding customer funds. The fiat account sub-system 120 may process receipts of funds, e.g., from a bank, via a wire transfer, via a credit card or ACH transfer, and/or via check, to name a few. Accordingly, the fiat account sub-system 120 may communicate with one or more external systems, such as a bank computer system 122.

Figure 1C:
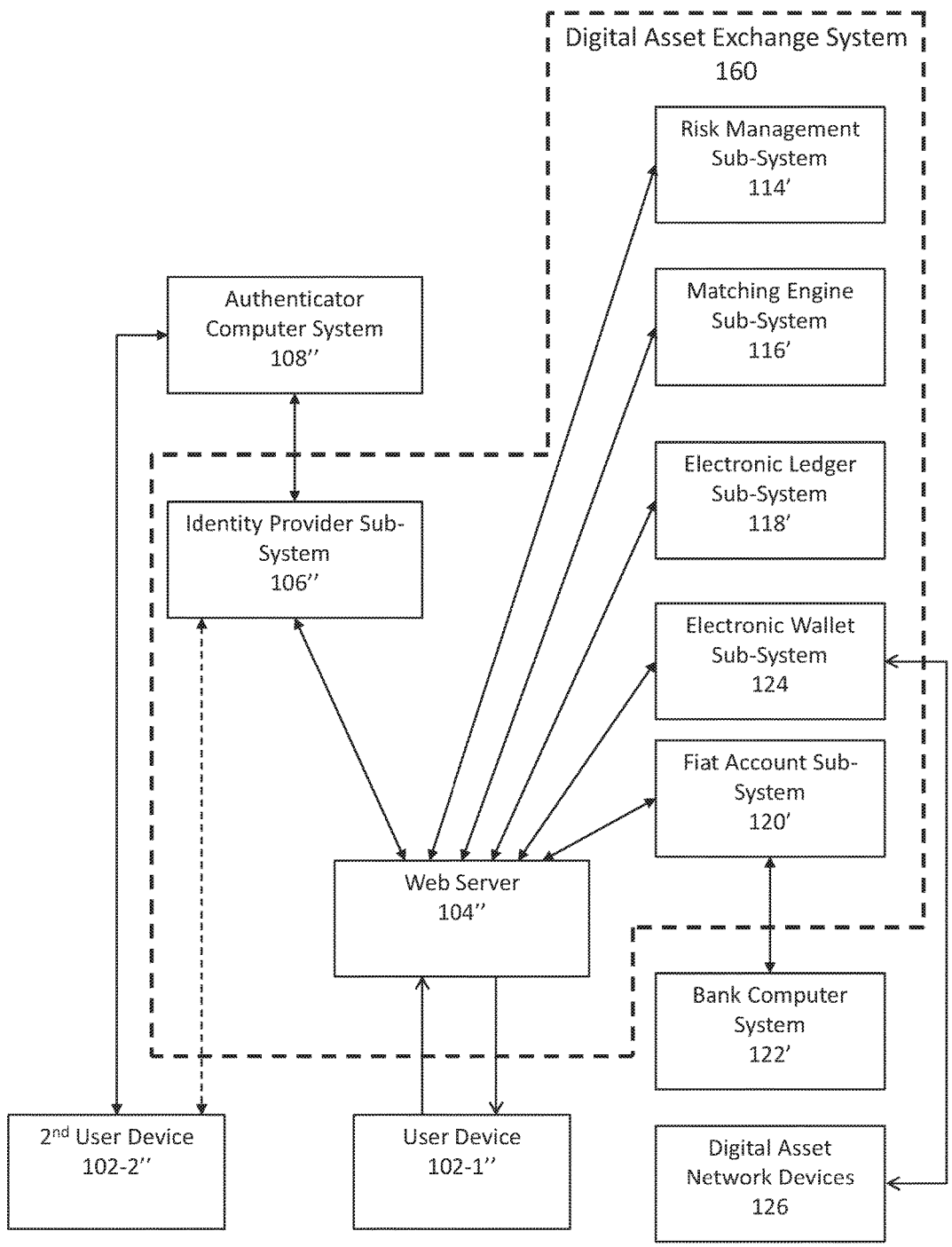

FIG. 1C illustrates components for secure, authenticated distributed computing in an exemplary digital asset exchange system. The system components can include the hardware and/or software described with respect to FIG. 1A. The system may also include components as described with respect to FIGS. 1A and 1B. Accordingly, a digital asset exchange system 160 can include a web server 104", an identity provider sub-system 106", and an authenticator computer system 108". The system may also communicate with user devices 102-1 and 102-1 and/or one or more external systems, such as a bank computer system 122' and/or digital asset network devices 126. Digital asset network devices 126 can include user devices running a digital asset network client (e.g., specific software configured to create a digital asset network), a digital asset network ledger, which may be centralized or decentralized (e.g., distributed via a digital asset network client, as with the Bitcoin Blockchain).

As with the financial exchange system 150 of FIG. 1B, the digital asset exchange system 160 of FIG. 1C can include a risk management sub-system 114', a matching engine sub-system 116', an electronic ledger sub-system 118', and a fiat account sub-system 120'. The electronic ledger sub-system 118' may track both fiat funds and digital assets associated with a plurality of users and/or user accounts and/or may perform other processes as described with respect to sub-system 118 of FIG. 1B, for fiat funds and/or digital assets. The digital asset exchange system 160 can also include an electronic wallet sub-system 124, which may process receipts of digital assets, storage of digital assets, pooled storage of digital assets, digital asset storage security, and/or transfers of digital assets, to name a few.

Figure 2A:
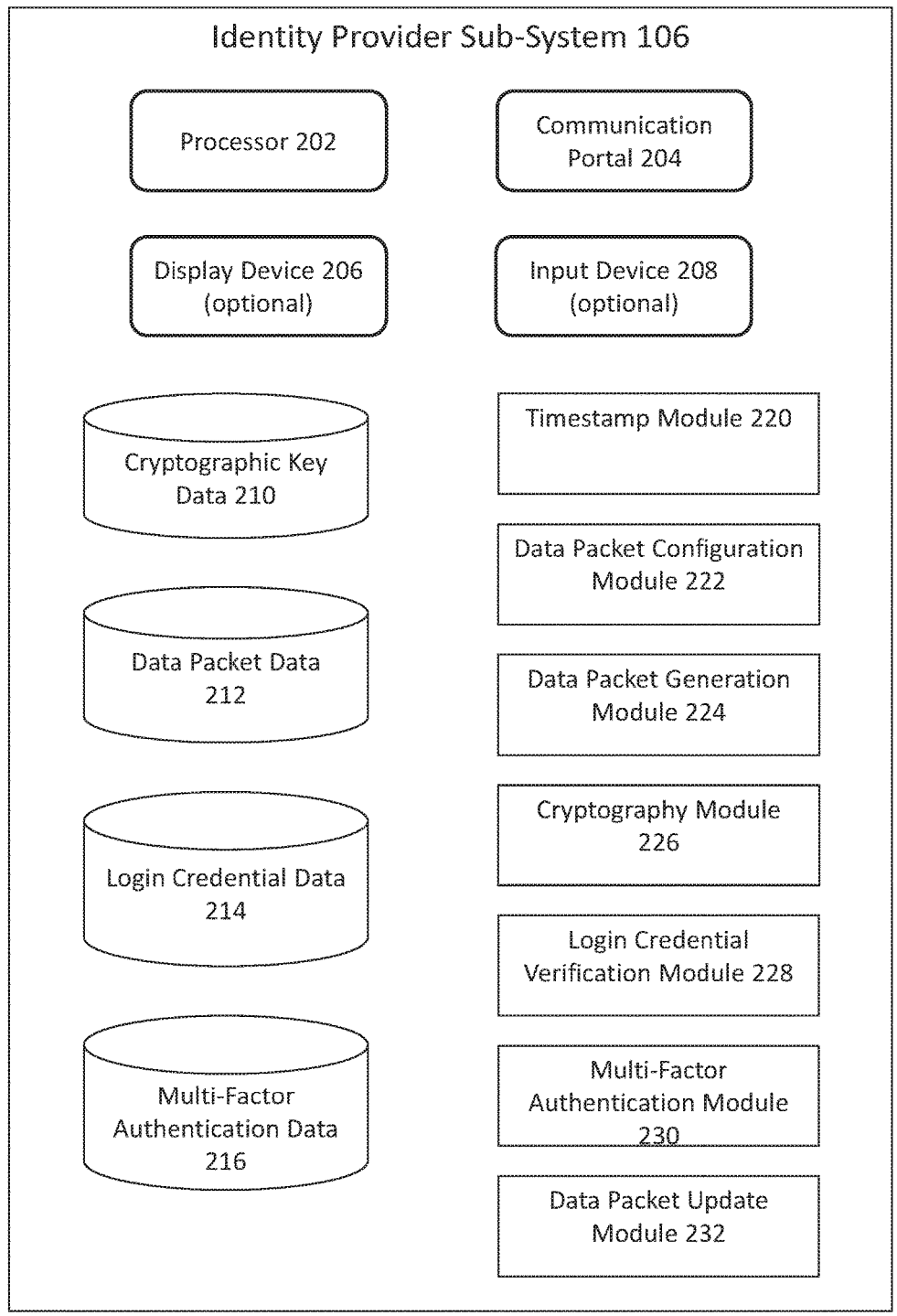
FIG. 2A is a schematic diagram of an identity provider computer sub-system in accordance with exemplary embodiments of the present invention.

FIG. 2A is a schematic diagram of an exemplary identity provider sub-system 106. The sub-system 106 may comprise one or more processors 202 and a communication portal 204, as described with respect to FIG. 1A. The identity provider sub-system 106 may also include one or more display device 206 and/or input device 208. Sub-system 106 can include non-transitory computer-readable memory, which may comprise one or more database. Data stored in the memory can include cryptographic key data 210, data packet data 212, login credential data 214, and/or multi-factor authentication data 216, to name a few. Sub-system 106 can comprise one or more software modules stored in the memory and running or configured to run on the one or more processors 202. Such modules can include a timestamp module 220, data packet configuration module 222, data packet generation module 224, cryptography module 226, login credential verification module 228, multi-factor authentication module 230, and/or data packet update module 232, to name a few. The functions described herein with respect to each module may be performed by one or more other modules (e.g., additional modules and/or consolidated with other modules described herein).

Cryptographic key data 210 may include cryptographic key pairs, such as a private key and/or a corresponding public key. Such keys may be RSA keys. The private key may be used to sign data packets. In embodiments, the public key may be provided to other sub-systems, which can use the public key to read and/or verify the contents of data packets signed by the identity provider sub-system 106 using its private key.

Data packet data 212 can include data packet payload data. Payload data can include user identifiers, account identifiers (e.g., indicating a user account or parent account associated with a request, such as an access request, a data request, or a transaction request received from a user device 102), and/or session identifiers (e.g., unique identifiers such as alphanumeric sequences assigned to particular user sessions). Payload data can also include timestamp information, which may correspond to a time at which a data packet was generated, configured, signed, and/or modified, or a time at which a user request was received, to name a few. Payload data can include authentication information, which may indicate the status of user credential verification processes and/or two-factor authentication processes. In embodiments, the identity provider sub-system 106 may maintain (e.g., store and/or update) a log of electronic requests (e.g., IDP data packet generation requests, IDP data packet update requests, user login requests, to name a few) and/or a log of data packet creations, updates, and/or expirations, to name a few.

Login credential data 214 may comprise a username and/or password. A username may be an alphanumeric text sequence, an email address, and/or a phone number, to name a few. In embodiments, login credential data 214 may be used to verify login credentials received from a user device 102.

Multi-factor authentication data 216 may comprise user account identifiers and/or user identifiers, authentication tokens, and/or secret seeds used to generate and/or verify authentication tokens. In embodiments, multi-factor authentication data 216 may comprise two-factor authentication data. Multi-factor authentication data 216 may include user biometric data (e.g., voice samples), photographs, and/or electronic copies, scans, images of government-issued identification or identification issued by other organizations, and/or security questions, to name a few.

The identity provider sub-system 106 may be programmed to verify user authorization to access a website or data from a data network (e.g., using a downloadable mobile application). Verifying authorization can comprise verifying user credentials, verifying multi-factor authentication, verifying that a user session has not expired (e.g., not exceeded a threshold period of time), verifying that a particular user account is not suspended or flagged, and/or verifying that a particular user account is permitted to access specific data, to name a few. The identity provider sub-system 106 may configure an IDP data packet payload with verification information and/or a current timestamp, and the sub-system 106 may sign the data packet using the identity provider private key. The identity provider sub-system 106 may transmit the signed IDP data packet to one or more other sub-systems.

Accordingly, the identity provider sub-system 106 may have a timestamp module 220 to determine the current time and/or provide a timestamp. The timestamp may be included in an IDP data packet, e.g., as part of a hashed payload. The timestamp may be used in a TOTP to generate and/or verify an authentication token. The timestamp may be used to verify that a user session has not expired and/or that a preexisting IDP data packet has not expired (e.g., exceeded a threshold period of time, such as 5 minutes, 10 minutes, 15 minutes, 30 minutes, 1 day, to name a few).

The data packet configuration module 222 may configure a data packet, e.g., by setting values of payload variables, appending data to a payload, and/or modifying data in a payload. For example, payload logic rules may require specific data elements in the payload, such as a current timestamp, a user ID, and/or a session ID, to name a few. The data packet configuration module may assemble the required elements and/or set the values of variables therefor (e.g., setting a timestamp associated with a timestamp data field) in order to configure the data packet.

The data packet generation module 224 may generate a data packet by hashing the configured data packet payload by applying a hash algorithm to the data payload. The hash algorithm may produce a unique payload based upon unique data, where a current timestamp combined with the other payload data helps enforce uniqueness within the system. Generating a data packet may comprise processing a data payload to transform it into a data packet that can be transmitted to other sub-systems and/or to external systems. In embodiments, the data packet generation module 224 may generate an HTTP cookie containing the configured payload data. In embodiments, configuring a data packet may comprise generating a data packet with the configured payload data.

The cryptography module 226 may digitally sign IDP data packets using the identity provider private key. For example, a data packet generated via an algorithmic hash of a configured data payload may be signed. Other sub-systems may verify the signature and/or read the data packet contents using a corresponding public key, but only the identity provider sub-system 106 can provide the signature. Accordingly, the other sub-systems may each verify an identity provider sub-system signature before further processing, e.g., in response to a user request. The cryptography module 226 itself may verify existing data packet signatures, including the signatures of other sub-systems using public keys corresponding to the respective sub-system private keys.

The login credential verification module 228 may verify login credentials received from a user device 102. The module 228 may compare a received username and password with a username and password stored in a credentials database. The module 228 may generate an electronic notification that credentials were verified or rejected. In embodiments, such a notification may be provided to a web server 104, which may provide corresponding display data to the user device 102 (e.g., providing access to data after credentials were verified or prompting the user to input different credentials after credentials were rejected). In embodiments, an IDP data packet will not be generated and/or signed without credential verification.

The multi-factor authentication module 230 may perform multi-factor authentication, such as generating an authentication token, providing a token to a user device, verifying an authentication token, and/or comparing biometric samples or images of a user, to name a few. In embodiments, such multi-factor authentication operations may be performed by an authenticator computer system 108. The multi-factor authentication module 230 may communicate with the authenticator computer system 108 to request multi-factor authentication of a particular user or user account and/or to receive authentication verification or rejection data from the authenticator computer system 108.

The data packet update module 232 may process electronic requests (e.g., received from other sub-systems) for an updated IDP data packet. Accordingly, the data packet update module 232 may cause an existing data packet to be updated with a current timestamp and a new identity provider sub-system signature. In embodiments, the data packet update module 232 may cause a new IDP data packet to be generated (e.g., by the data packet configuration module 222, generation module 224, and/or cryptography module 226) having a current timestamp. An updated IDP data packet may comprise updated payload data, in addition to the updated timestamp. For example, a first IDP data packet may include login credential verification data, while a second, updated IDP data packet may also include multi-factor authentication verification data.

Figure 2B:
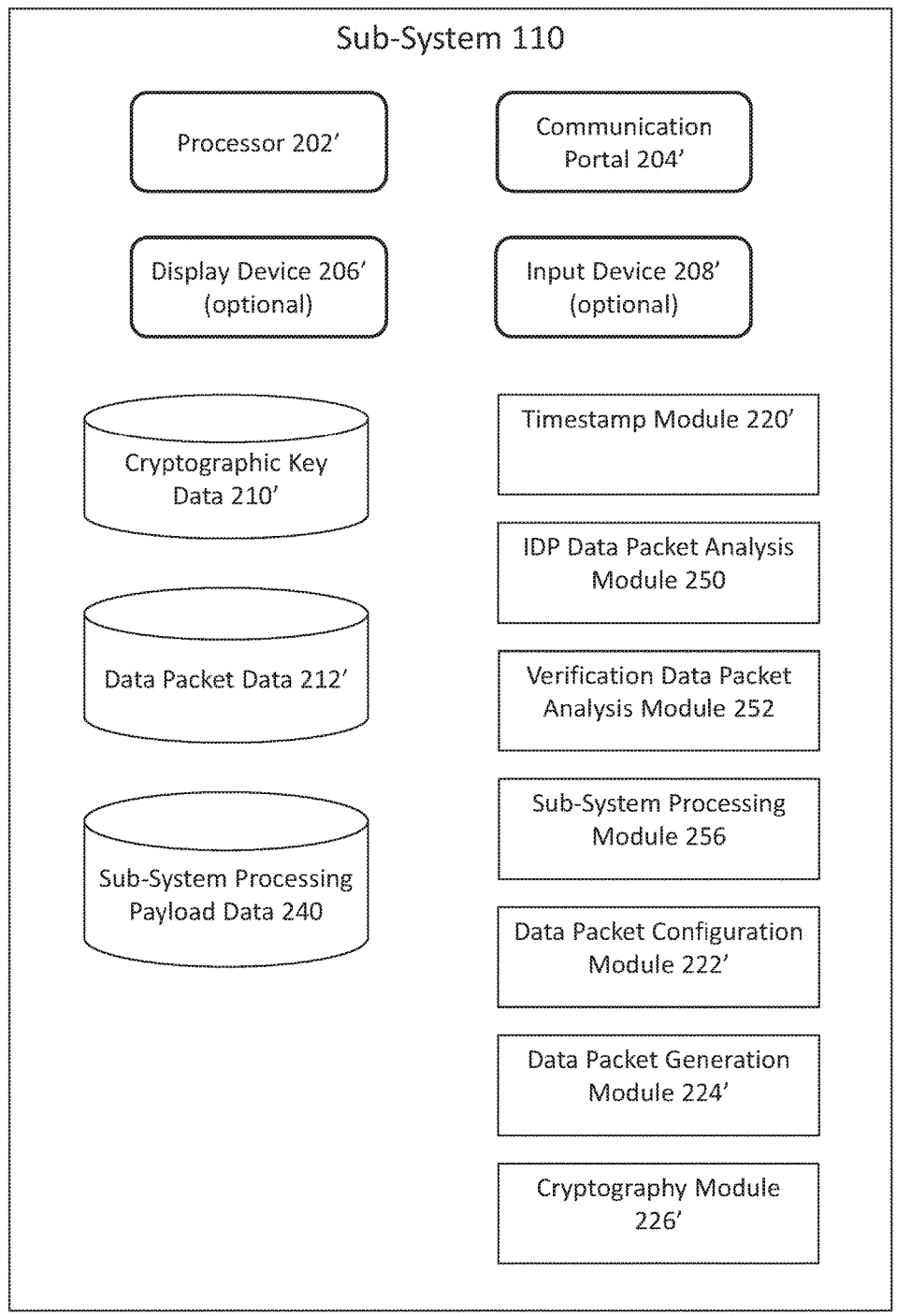
FIG. 2B is a schematic diagram of a distributed computing processing sub-system in accordance with exemplary embodiments of the present invention.

FIG. 2B is a schematic diagram of an exemplary sub-system 110, which may be a sub-system for performing system processes. The sub-system 110 may comprise one or more processors 202' and one or more communication portals 204', as described with respect to FIG. 1A. The sub-system 110 may also include one or more display device 206' and/or input device 208'. Sub-system 110 can include non-transitory computer-readable memory, which may comprise one or more database. Data stored in the memory can include cryptographic key data 210' and data packet data 212', as described with respect to FIG. 2A. Data can also include sub-system processing payload data 240. Sub-system 110 can comprise one or more software modules stored in the memory and running or configured to run on the one or more processors 202'. Such modules can include a timestamp module 220', data packet configuration module 222', data packet generation module 224', and/or cryptography module 226', as described with respect to FIG. 2A. Modules can also include an IDP data packet analysis module 250, verification data packet analysis module 252, and/or sub-system processing module 256, to name a few. The functions described herein with respect to each module may be performed by one or more other modules (e.g., additional modules and/or consolidated with other modules described herein).

Sub-system processing payload data 240 may comprise data related to core processes performed by the sub-system, such as computations, verifications, transactions, electronic message generations, to name a few. Such data may be provided to one or more other sub-systems. In embodiments, such data may be provided to a web server 104 for formatting and/or transmission to a user device 102.

The sub-system processing module 256 may perform core sub-system processes. Such processes may be performed periodically, e.g., at predetermined times or intervals, continuously (e.g., active monitoring operations), and/or in response to events (e.g., triggering events and/or electronic requests received from user devices, the web server 104, and/or other sub-systems, to name a few).

The IDP data packet analysis module 250 may verify an identity provider sub-system signature, e.g., using a public key corresponding to the identity provider sub-system private key. Accordingly, the module 250 may confirm that a signature on an IDP data packet originated from the identity provider sub-system 106. In embodiments, such a verification may use the cryptography module 226'.

In embodiments, a sub-system may receive a verification data packet from one or more other sub-systems. The verification data packet, which may be signed by one or more sub-systems, may certify that the verification data packet payload and/or data received along with the verification data packet (e.g., in accompanying data packets) originated from a sub-system and not an unauthorized third party. Accordingly, the verification data packet may provide a mechanism for intra-system trust. A sub-system 110 may disregard data and/or electronic requests not accompanied by or contained within a verification data packet whose signature has been verified by the sub-system 110. In embodiments, each sub-system may generate its own verification data packet. In other embodiments, each sub-system may append data and/or a signature onto a single verification data packet.

The verification data packet analysis module 252 may verify one or more sub-system signatures on a verification data packet, e.g., using public keys corresponding to the private keys of the respective one or more sub-systems that signed the verification data packet. The verification data packet analysis module 252 may prevent execution of sub-system processes if the verification data packet is not verified by the sub-system 110.

The data packet configuration module 222' may configure a payload, e.g., for a verification data packet from the sub-system 110. The data packet generation module 224' may generate such a data packet, and the cryptography module 226' may be used to sign it using the private key of the sub-system 110.

Figure 5:
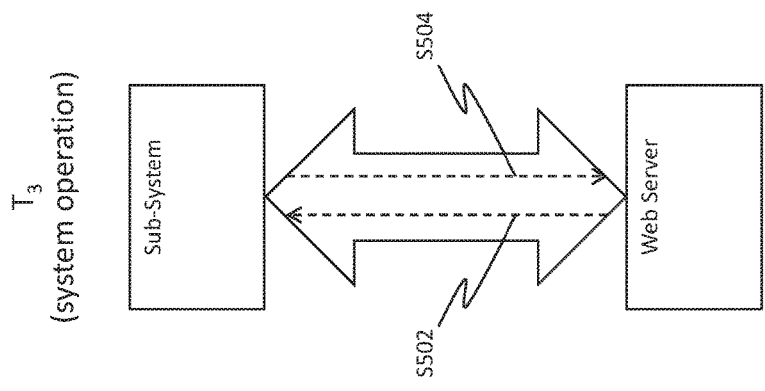
FIG. 5 is a schematic diagram of communications between a web server and a sub-system in accordance with exemplary embodiments of the present invention.

FIGS. 3A-C, 4A-C, and 5 are schematic diagrams illustrating exemplary communications in the exemplary system for secure, authenticated distributed computing. Communications between system components or sub-systems may be described as transmissions or receipts with the understanding, for example, that a transmission from A to B can include a receipt at B from A. FIGS. 3A-C illustrate communications between a user device 102 and a web server 104 at various time intervals (e.g., $T_1$, $T_2$, $T_3$). Times are described with respect to time intervals because the illustrated communications are often asynchronous. Accordingly, the communications within a time interval may occur in a sequence and not at the same exact time. FIGS. 4A-C illustrate exemplary communications between a web server 104 and an identity provider sub-system 106 within the same time intervals depicted in FIGS. 3A-C (e.g., $T_1$, $T_2$, $T_3$). In embodiments, the communications of FIGS. 4A-C may comprise part of the same sequence as the communications within the corresponding time interval of FIGS. 3A-C. For example, an exemplary communication sequence may comprise step S302, followed by step S402, followed by step S404, and then step S304. FIG. 5 illustrates exemplary communications between a web server 104 and a sub-system 110, which may also occur within time interval $T_3$. For example, in embodiments, step S410 and step S502 may occur or be initiated at approximately the same time, e.g. within one second of each other. In embodiments, such a communication can occur at a later time, e.g., during time interval $T_4$.

Turning to FIG. 3A, time interval $T_1$ may be associated with login request processes, comprising a user device requesting access to data from a web server and receiving a response. Prior to time interval $T_1$, the web server may have provided display data to the user device associated with a user interface for submitting a login request. In the time interval $T_1$, at a step S302, a user device may transmit to a web server a user device electronic login request comprising login credentials (e.g., a username and/or password). Accordingly, the web server may receive the electronic login request. The login credentials may be transmitted as one or more data packets.

At a step S304, also within the time interval $T_1$, the web server may transmit and the user device may receive a first signed IDP data packet and first display data. In embodiments, the first signed IDP data packet and the first display data may be transmitted separately. In other embodiments, they may be transmitted together, such as via distinct data packets comprising a single data transmission. The first signed IDP data packet may comprise an HTTP cookie, which may have been generated by the web server based upon an IDP data packet received from the identity provider sub-system. The HTTP cookie may reside on the user device, e.g., associated with an Internet browser or with a mobile application. The first signed IDP data packet may comprise at least login credential verification information indicating that the system verified the login credentials received from the user device. In embodiments, the web server may encrypt the first signed IDP data packet (e.g., by applying an encryption algorithm) before transmitting it to the user device. The first display data may comprise data to generate a display and/or display a multi-factor authentication user interface (e.g., for inputting multi-factor authentication information).

Referring to FIG. 3B, a time interval $T_2$ may correspond to multi-factor authentication processes. In embodiments, multi-factor authentication may not be employed, and accordingly, the processes described with respect thereto may not be performed. In the time interval T2, at a step S306, a user device may transmit to a web server, which may receive, e.g., via a data network, user device multi-factor authentication data, which may comprise a multi-factor authentication data packet. Multi-factor authentication data can include an alphanumeric text sequence (e.g., transmitted to a second user device and input at the first user device for transmission to the web server). In embodiments, multi-factor authentication data can include an authentication token, which may be generated by a secret seed stored at the user device. In the step S306 the user device may also transmit to the web server the first signed IDP data packet. The first signed IDP data packet may have been stored at the user device following its receipt from the web server. The first signed IDP data packet may be used to indicate to the web server and/or other sub-systems that the user device credentials were verified and/or that a user session has not expired. In embodiments, the user device transmissions of step S306 may comprise separate transmissions. The web server may decrypt the first signed IDP data packet if it is encrypted.

At a step S308, also with the time interval $T_2$, the web server may transmit to the user device a second signed IDP data packet and second display data. The second signed IDP data packet and second display data may be transmitted separately or as part of the same transmission. The second signed IDP data packet may comprise at least authentication verification data indicating that multi-factor authentication was performed. It may be encrypted, e.g., by the web server prior to transmission. The second display data may comprise data to generate a display and/or display a user interface. Such a user interface may present information from the distributed computing system and/or electronic elements for user actions (e.g., user selections, user inputs, to name a few).

Referring to FIG. 3C, a time interval $T_3$ may correspond to system operations. Such system operations may be performed only after a user is authenticated, such as through login credentials and/or multi-factor authentication. In the time interval $T_3$, at a step S310, the user device may transmit to the web server a user data packet. Such a data packet may comprise data requiring processing by the computer system and/or an electronic request requiring processing. The user device may also transmit to the web server the second signed IDP data packet. The web server may decrypt the IDP data packet if it is encrypted. The second signed IDP data packet may indicate that the user has been fully authenticated, and the system can proceed with processing the received user data packet. In embodiments where only one level of user verification is required this may be a first signed IDP data packet.

At a step S312, also in time interval $T_3$ the web server may transmit to the user device a third signed IDP data packet and third display data. The third signed IDP data packet and third display data may be transmitted separately or together. The third signed IDP data packet may contain some of the same information as the preceding second signed IDP data packet (e.g., user ID, session ID, user authentication information, to name a few), but may also contain updated time information (e.g., an updated timestamp). The third signed IDP data packet may thus be used to ensure that a user session has not timed out (e.g., that a threshold period of time from a last user action was not exceeded). The third signed IDP data packet may be encrypted prior to transmission. The third display data may comprise a user interface containing information and/or user options in response to the user request. For example, if the user data packet comprised an electronic user request for a current account balance from a financial exchange computer system, the third display data may indicate the balance.

Turning to FIGS. 4A-C, communications processes related to the time intervals $T_1$, $T_2$, and $T_3$ are shown. In FIG. 4A in a time interval $T_1$, at a step S402, the web server may transmit a login credentials data packet to the identity provider sub-system. The login credential data packet may be the same as the user device electronic login request and/or may contain information from the user device electronic login request, such as a username and password.

Still in time interval $T_1$, at a step S404, the identity provider sub-system may transmit a first signed IDP data packet to the web server. As described with respect to FIG. 3A, the first signed IDP data packet may contain login credential verification information.

Referring to FIG. 4B, in the time interval $T_2$ and at a step S406, the web server may transmit to the identity provider sub-system a multi-factor authentication data packet, which is described with respect to FIG. 3B. The multi-factor authentication data packet may comprise an electronic request for multi-factor authentication and/or corresponding multi-factor authentication data (e.g., an authentication token). The web server may also transmit to the identity provider sub-system the first signed IDP data packet. The web server may transmit to the identity provider sub-system an electronic request for an updated IDP data packet. In embodiments, the web server may decrypt the existing IDP data packet before transmitting it to the identity provider sub-system. The web server and/or the identity provider sub-system may rely upon the first signed IDP data packet to determine whether a user session is active and/or whether multi-factor authentication can proceed.

Still in time interval $T_2$, at a step S408, the identity provider sub-system may transmit a second signed IDP data packet to the web server. The second signed IDP data packet may contain information related to multi-factor authentication that was successfully performed. The second signed IDP data packet may also comprise an updated timestamp.

Referring to FIG. 4C, in the time interval $T_3$, at a step S410, the web server may transmit to the identity provider sub-system an electronic request for an updated IDP data packet, which may be a third signed IDP data packet. As described with respect to FIG. 3C, an updated IDP data packet may contain an updated timestamp to maintain (e.g., prolong) the user session without expiration so long as user activity is detected (e.g., received by the web server). The web server may also transmit to the identity provider sub-system the second signed IDP data packet, which may contain the existing user session information and/or verification information. In embodiments, the second signed IDP data packet or data contained in its payload may be used to generate the updated IDP data packet.

Also in the time interval $T_3$, at a step S412, the identity provider sub-system may transmit a third signed IDP data packet to the web server. The third signed IDP data packet may be the updated IDP data packet comprising updated time information.

Turning to FIG. 5, communications between the web server and a sub-system are shown, following the authentication of a user. In the time interval $T_3$, at a step S502, the web server may transmit an electronic request for system processing to the sub-system. The web server may also transmit to the sub-system the second signed IDP data packet containing the existing authentication information. In embodiments, it may transmit the third signed IDP data packet following its receipt from the identity provider sub-system. In embodiments, a signed web server verification data packet may be transmitted to the sub-system. The signed web server verification data packet may certify that the processing request was an authorized request from the web server.

Still in the time interval T3, at a step S504, the sub-system may transmit a sub-system data packet to the web server. The sub-system data packet may contain the results of the sub-system processing. As described herein, a data packet transmission may actually comprise a plurality of data packets. The sub-system may also transmit to the web server a sub-system signed verification data packet. The sub-system signed verification data packet may indicate that the processing was performed by the sub-system. In embodiments, the signed sub-system verification data packet may comprise a modification of (e.g., by appending to) an existing sub-system verification data packet, such as the web server verification data packet, which can be passed among the sub-systems during their processing. In embodiments, verification data packets may be used for processing requiring data from or processes performed by multiple sub-systems and/or for processes where security is required or desired to prevent unauthorized access to data or unauthorized insertion of data into the system. In embodiments, verification data packets may not be used when communicating between other sub-systems and the web server.

Figure 6A:
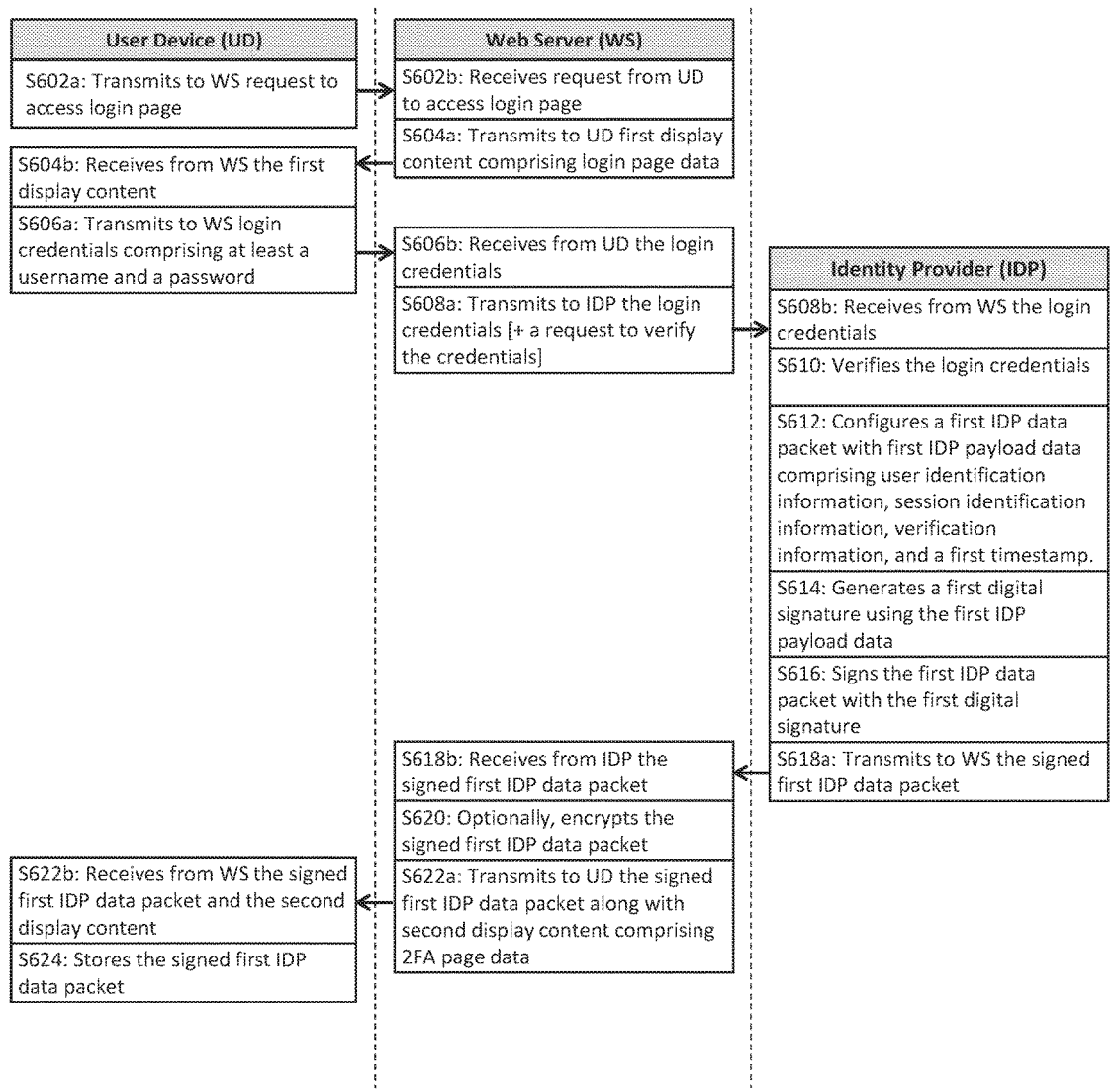
FIGS. 6A-C are flow charts of an exemplary process for user authentication in accordance with exemplary embodiments of the present invention.
Figure 6B:
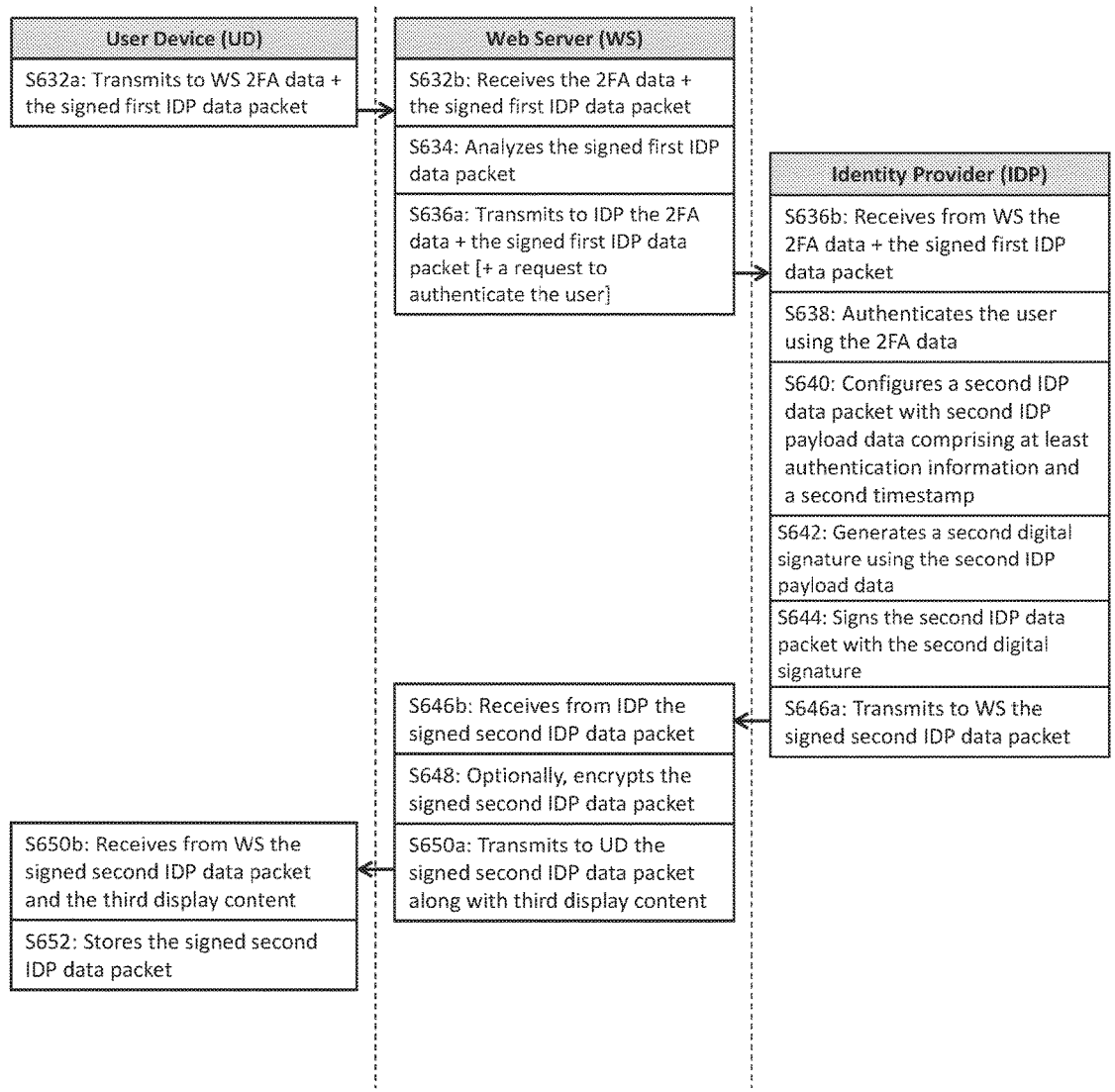
Figure 6C:
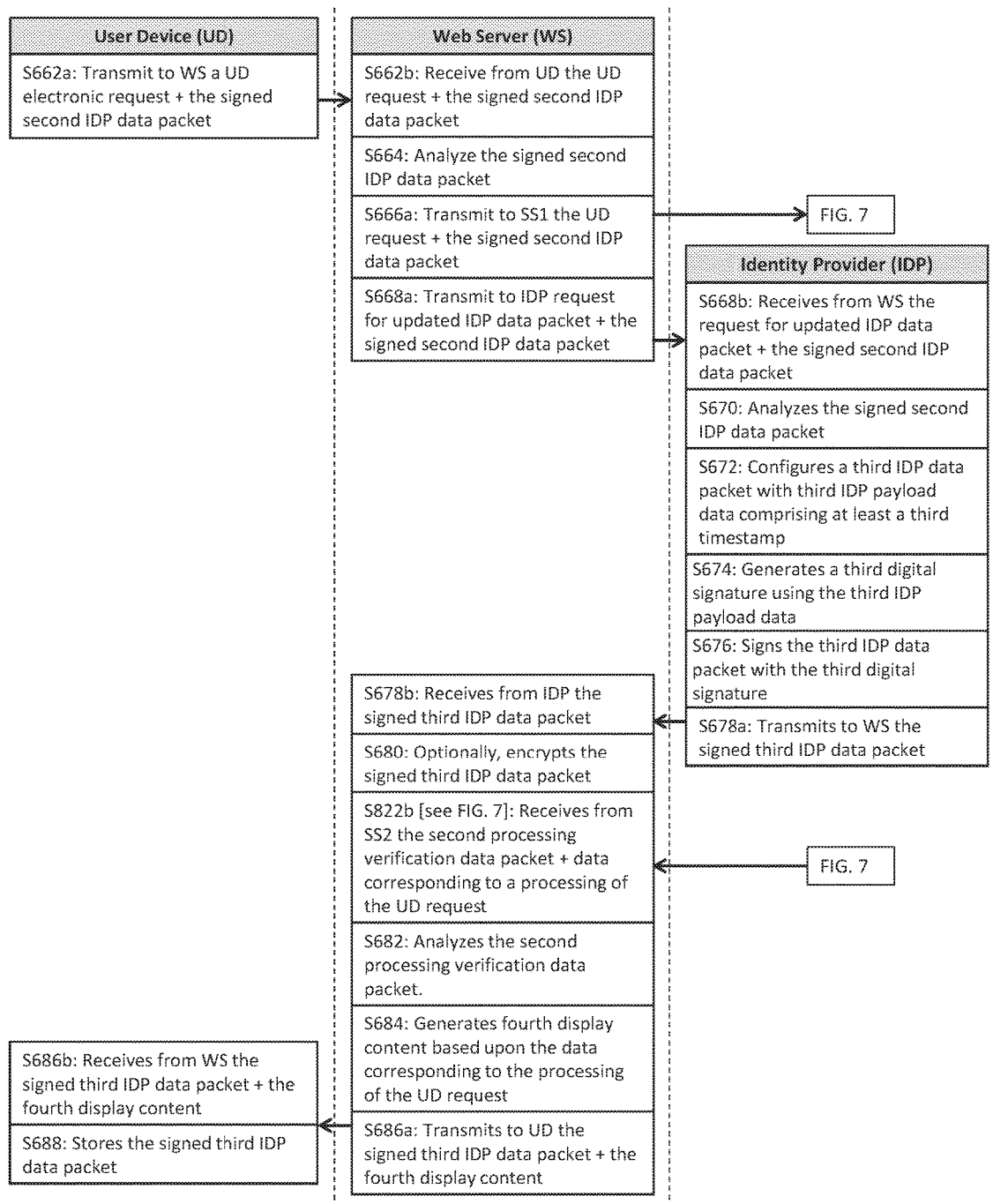

FIGS. 6A-C are flow charts of an exemplary process for user authentication in accordance with exemplary embodiments of the present invention. These processes entail generation and transmission of an IDP data packet to track user access authorization in a distributed computing system. A computing system is described with respect to a web server, which can provide user access to the computing system, an identity provider, which can perform processes to verify and/or certify user authorization, and one or more sub-systems that can perform computing processes associated with the functions of the computing system. For convenience, multi-factor authentication processes are described with respect to the identity provider, although such processes may be performed in whole or in part by one or more other sub-systems or external systems. One or more user device may access the computing system. Data transmitted to and/or among the system components may be transmitted via one or more data packets or via data streams. In embodiments, communications may be encrypted. In embodiments, only certain communications may be encrypted or communications between certain devices and/or system components, such as the web server and the user device. Accordingly, any transmission steps described herein may first entail encrypting the electronic message (e.g., the data packet), and any receipts of data may comprise decrypting the electronic message.

In a step S602a, a user device may transmit to the web server an electronic request to access a login page. In a step S602b, the web server may receive the electronic request. In embodiments, such a request may comprise navigating to a URL, selecting a login user interface element (e.g., an electronic login or sign in button), opening downloadable software (e.g., a mobile application running on a mobile user device, such as a smart phone or a tablet computer), and/or selecting a login option or content requiring a login (e.g., an electronic user interface element for performing a transaction or viewing user account data), to name a few.

In a step S604a, the web server may transmit to the user device first display content comprising login page data. In embodiments, display content may be a webpage, webpage content, machine-readable instructions for rendering a webpage (e.g., HTML and/or JavaScript computer code), application display content (e.g., for displaying content on a mobile application), and/or machine-readable instructions for rendering application display content, to name a few.

In a step S604b, the user device may receive the first display content from the web server. In embodiments, the user device may render or otherwise display the first display content. This may comprise showing a login form with user interface elements for inputting login credentials (e.g., a username text input box and/or a password text input box). In embodiments, login credentials may comprise or may be determined from user biometric information, such as a fingerprint input electronically (e.g., via a fingerprint scanner) or a voice sample, and/or from an image of the user (e.g., via a camera and/or using facial recognition software).

In a step S606a, the user device may transmit to the web server login credentials, which may comprise at least a username and a password. In embodiments, login credentials may also comprise biometric information, answers to security questions, and/or other user descriptive data (e.g., a physical or electronic address, such as an IP address, a current location, which may be determined automatically by the user device or the computing system, such as via triangulation or a sensor such as a global position system (GPS) device, and/or device type information, such as indicating a model or serial number of the user device, to name a few). In embodiments, login credential verification may be performed locally at the user device. In such a case the login credential verification data indicating the outcome of the verification (e.g., a successful verification) may be transmitted to the web server.

In a step S606b, the web server may receive from the user device the login credentials.

In a step S608a, the web server may transmit to the identity provider sub-system the login credentials. In embodiments, the web server may also transmit an electronic request to verify the login credentials.

In a step S608b, the identity provider sub-system may receive the login credentials and/or the accompanying electronic request for verification.

In a step S610, the identity provider sub-system may verify the login credentials. Credential verification may comprise comparing the received login credentials against a login credential database, which may be stored in non-transitory computer readable memory operatively connected to the computing system and/or one or more sub-systems thereof.

In a step S612, the identity provider sub-system may configure a first IDP data packet with first identity provider payload data. The payload data may comprise user identification information, session identification information, verification information (e.g., comprising the login credentials and/or a login credential verification status indicator to indicate whether the login credentials were successfully verified), and/or a first timestamp. Configuring the data packet may comprise generating information for one or more data fields (e.g., a timestamp data field), accessing information for the one or more data fields (e.g., from other sub-systems or from one or more databases), and/or setting values of the one or more data fields (e.g., creating and/or populating an electronic array or an object in working memory to organize and/or store the payload data).

In a step S614, the identity provider sub-system may generate a first digital signature. In embodiments, the signature may comprise an encryption using the identity provider sub-system private key. The identity provider sub-system may generate a hash of the payload data, e.g., by applying an algorithm that can generate a fixed-length output with a smaller size in computer-readable memory. The identity provider sub-system may use the hashed payload to generate the digital signature, such as by encrypting the payload with the private key. In embodiments, the digital signature may be based on the non-hashed payload, e.g., by encrypting the payload with the private key.

In a step S616, the identity provider sub-system may sign the first IDP data packet with the first digital signature. In embodiments, signing the data packet may comprise appending the generated digital signature to the data packet or otherwise inserting the digital signature into the data packet.

In a step S618a, the identity provider sub-system may transmit to the web server the signed first IDP data packet.

In a step S618b, the web server may receive from the identity provider sub-system the signed first IDP data packet.

In a step S620, the web server may encrypt the signed first IDP data packet, e.g., for secure transmission to the user device. In embodiments, the web server may encrypt any electronic messages, including display content, that will be transmitted, e.g., to a user device. Encryption may be optional. The web server may otherwise reformat or regenerate the data for delivery to the user device. For example, in embodiments the web server may generate an HTTP cookie based upon the signed first IDP data packet.

In a step S622a, the web server may transmit to the user device the first signed IDP data packet. The web server may also transmit second display data for displaying content at the user device, which may provide a user interface for inputting multi-factor authentication data, such as an authentication token or alphanumeric sequence. In embodiments, these transmissions may be bundled together in a single transmission of one or more data packets, or they may occur asynchronously.

In a step 622b, the user device may receive from the web server the signed first IDP data packet and the second display data. The user device may render an electronic display, such as showing a webpage or particular content on a mobile application, based upon the second display data.

In a step S624, the user device may store the signed first IDP data packet. The data packet may be stored in non-transitory computer-readable memory. In embodiments, it may be stored, e.g., by a web browser, as an HTTP cookie.

FIG. 6B shows additional steps in processes for providing secure user authentication in a distributed computing system.

In a step S632a, the user device may transmit to the web server multi-factor authentication data (e.g., an authentication token). The user device may also transmit the signed first IDP data packet, which it had stored locally.

In a step S632b, the web server may receive from the user device the multi-factor authentication data and the signed first IDP data packet.

In a step S634, the web server may analyze the signed first IDP data packet. The web server may verify the digital signature using a public key corresponding to the identity provider sub-system private key. The web server may analyze the payload data to determine whether the user device and/or its user are authorized to access the distributed computing system, before transactions therewith, and/or receive data therefrom. For example, the web server may analyze time information in the signed first IDP data packet by comparing the indicated time against a current time. The web server may then determine whether the elapsed time between the data packet timestamp and the current time exceeds a session duration threshold. Such a threshold may be stored in non-transitory computer-readable memory operatively connected to the distributed computing system, including the web server sub-system. The web server may also analyze the login credential information to determine whether a user's login credentials have already been verified. Verifying user authorization based upon the information in the signed first IDP data packet may be a prerequisite to further processing by the computing system.

In a step S636a, the web server may transmit to the identity provider sub-system the second authentication data. The web server may also transmit the signed first IDP data packet and/or any information contained therein. In embodiments, the web server may generate and transmit an electronic request for an updated IDP data packet. In embodiments, the web server may generate and transmit an electronic request to the identity provider sub-system for multi-factor authentication. In embodiments, the web server may transmit such a request and multi-factor authentication data to a multi-factor authentication sub-system or an external multi-factor authentication computer system.

In a step S636b, the identity provider sub-system may receive from the web server the multi-factor authentication data, the electronic request for multi-factor authentication, the signed first IDP data packet, and/or the electronic request for an updated IDP data packet.

In a step S638, the identity provider sub-system may authenticate the user using at least the multi-factor authentication data. Authenticating the user may comprise comparing the multi-factor authentication data (e.g., an authentication token, a biometric data sample, to name a few) to authentication reference data, which may be stored in non-transitory computer-readable memory operatively connected to the identity provider sub-system. In embodiments, the authentication operations may be performed by a different sub-system or an external computer system, and the authentication results may be transmitted to the identity provider sub-system.

In a step S640, the identity provider sub-system may configure a second IDP data packet with second IDP payload data. The second IDP payload data can include updated current time information. It can also include authentication verification information indicating the status of user authentication. Like the first IDP data payload data, the second IDP payload data may include user identification information and/or session identification information. In embodiments, the identity provider sub-system may generate a cookie, e.g., an HTTP cookie, containing the second IDP payload data.

In a step S642, the identity provider sub-system may generate a second digital signature using the identity provider sub-system private key. The digital signature may comprise an encryption of the second IDP payload data. In embodiments, the identity provider sub-system may generate a hash of the second IDP payload data, e.g., by applying a hash algorithm to the payload data. The identity provider sub-system may then generate the digital signature using the hashed payload data, such as by encrypting the hashed payload data.

In a step S644, the identity provider sub-system may sign the second IDP data packet with the second digital signature. In embodiments, the signature may be appended to or otherwise embedded in the data packet.

In a step S646a, the identity provider sub-system may transmit to the web server the signed second IDP data packet.

In a step S646b, the web server may receive from the identity provider sub-system the second IDP data packet. In embodiments, the web server may generate a cookie such as an HTTP cookie from the second IDP data packet.

In a step S648, the web server may encrypt the signed second IDP data packet, which may enable a secure transmission to the user device.

In a step S650a, the web server may transmit to the user device the signed second IDP data packet. The web server may also transmit third display content, which may correspond to access to the distributed computing system that was contingent on user authentication. These transmissions may be separate or together.

In a step S650b, the user device may receive from the web server the signed second IDP data packet and the third display content. The user device may decrypt any received encrypted transmissions. The user device may render the third display content on a display (e.g., a monitor and/or a touch screen).

In a step S652, the user device may store the second signed IDP data packet. If the data packet is a cookie, the user device may store the cookie, e.g., in local memory.

FIG. 6C illustrates additional steps and processes to establish and/or maintain secure user authentication in accordance with the present invention.

In a step S662a, the user device may transmit to the web server an electronic user request. The request may comprise a request for access to a particular portion of the distributed computing system, a transaction request, and/or a request for data, to name a few. The request may require processing by a sub-system of the distributed computing system. The user device may also transmit the signed second IDP data packet.

In a step S662b, the web server may receive from the user device the user electronic request and the signed second IDP data packet. The web server may decrypt any received encrypted messages, such as an encrypted signed second IDP data packet.

In a step S664, the web server may analyze the signed second IDP data packet. The web server may verify the digital signature on the data packet. The web server may verify that the user was previously fully authenticated (e.g., via login credentials and/or multi-factor authentication). The web server may also verify that a user session has not expired.

In a step S666a, the web server may analyze the user electronic request and determine how to route and/or route the request. Accordingly, the request may be relayed to a different sub-system SS1 for processing. In embodiments, the web server may generate an electronic processing request based upon the user request and transmit such processing request to the sub-system SS1. The web server may transmit the signed second IDP data packet along with the processing request. In embodiments, the IDP data packet that is passed among sub-system components, such as SS1 and SS2, may be a separate data packet from the data packet that is transmitted to and from the user device, but may contain some or all of the same information. In embodiments, it may be a copy of the IDP data packet received from the user device. In embodiments, the web server may generate and transmit a verification data packet to the sub-system SS1. The verification data packet may be signed by a private key of the web server to indicate the origin and/or authenticity of the verification data packet and/or accompanying data transmissions, such as electronic requests. Sub-system processing is described further herein with respect to FIG. 7.

In a step S668a, the web server may generate and transmit to the identity provider sub-system an electronic request for an updated IDP data packet. The web server may also transmit the signed second IDP data packet to the identity provider sub-system.

In a step S668b, the identity provider sub-system may receive from the web server the electronic request for an updated IDP data packet. The identity provider sub-system may also receive the signed second IDP data packet.

In a step S670, the identity provider sub-system may analyze the signed second IDP data packet. Analyzing the data packet may comprise verifying the digital signature and/or accessing information from the data packet payload. The identity provider sub-system may determine whether sufficient authorization (e.g., login credential verification and/or multi-factor authentication) was previously performed and/or whether a user session has not expired (e.g., by comparing time information in the data packet payload to current time information).

In a step S672, the identity provider sub-system may configure a third IDP data packet with third IDP payload data. The third payload data may comprise at least an updated current timestamp. The third payload data may also include the other data fields from the second IDP data packet, such as a session identifier, user or user account identifier, login credential verification information and/or multi-factor authentication verification information, to name a few.

In a step S674, the identity provider sub-system may generate a third digital signature using the third IDP payload data. The third digital signature may comprise an encrypted alphanumeric sequence generated using an encryption algorithm using the identity provider sub-system private key against the third IDP payload data or against a generated hash of the third IDP payload data.

In a step S676, the identity provider sub-system may sign the third IDP data packet with the third digital signature, e.g., by embedding the signature in the data packet.

In a step S678a, the identity provider sub-system may transmit to the web server the signed third IDP data packet.

In a step S678b, the web server may receive from the identity provider sub-system the signed third IDP data packet.

In a step S680, the web server may encrypt the signed third IDP data packet. In embodiments, the web server may convert the signed third IDP data packet into a cookie. In other embodiments, the identity provider sub-system may have generated and transmitted such a cookie to the web server.

In a step S822b, the web server may receive from a processing sub-system, e.g., sub-system SS2, a second verification data packet and/or data corresponding to a processing of the electronic user request. The processing of such a request by one or more processing sub-system and the use of verification data packets to provide authentication among the sub-systems is described herein with respect to FIG. 7.

In a step S682, the web server may analyze the received second processing verification data packet. For example, the web server may verify one or more digital signatures on the data packet corresponding to the one or more processing sub-systems that processed data for the data packet. Digital signatures may be verified by applying public keys corresponding to the private key that generated each sub-system signature. In embodiments, upon receipt of updated IDP data packets from the identity provider sub-system, the web server may also analyze such IDP data packets, e.g., to confirm the signature of the identity provider sub-system.

In a step S684, the web server may generate fourth display data based upon the data corresponding to the processing of the user request, which was received from a processing sub-system. In embodiments, display content is display data for generating a user interface (e.g., interface elements, information, electronic layout of the information, and/or behaviors bound to the interface elements, to name a few). Accordingly, the fourth display content may comprise display data for generating a user interface presenting information and/or options in response to the user request.

In a step S686a, the web server may transmit to the user device the signed third IDP data packet and the fourth display content.

In a step S686b, the user device may receive from the web server the signed third IDP data packet and the fourth display content. The user device may render a display using the fourth display content.

In a step S688, the user device may store the signed third IDP data packet, e.g., as a locally stored cookie.

Figure 7:
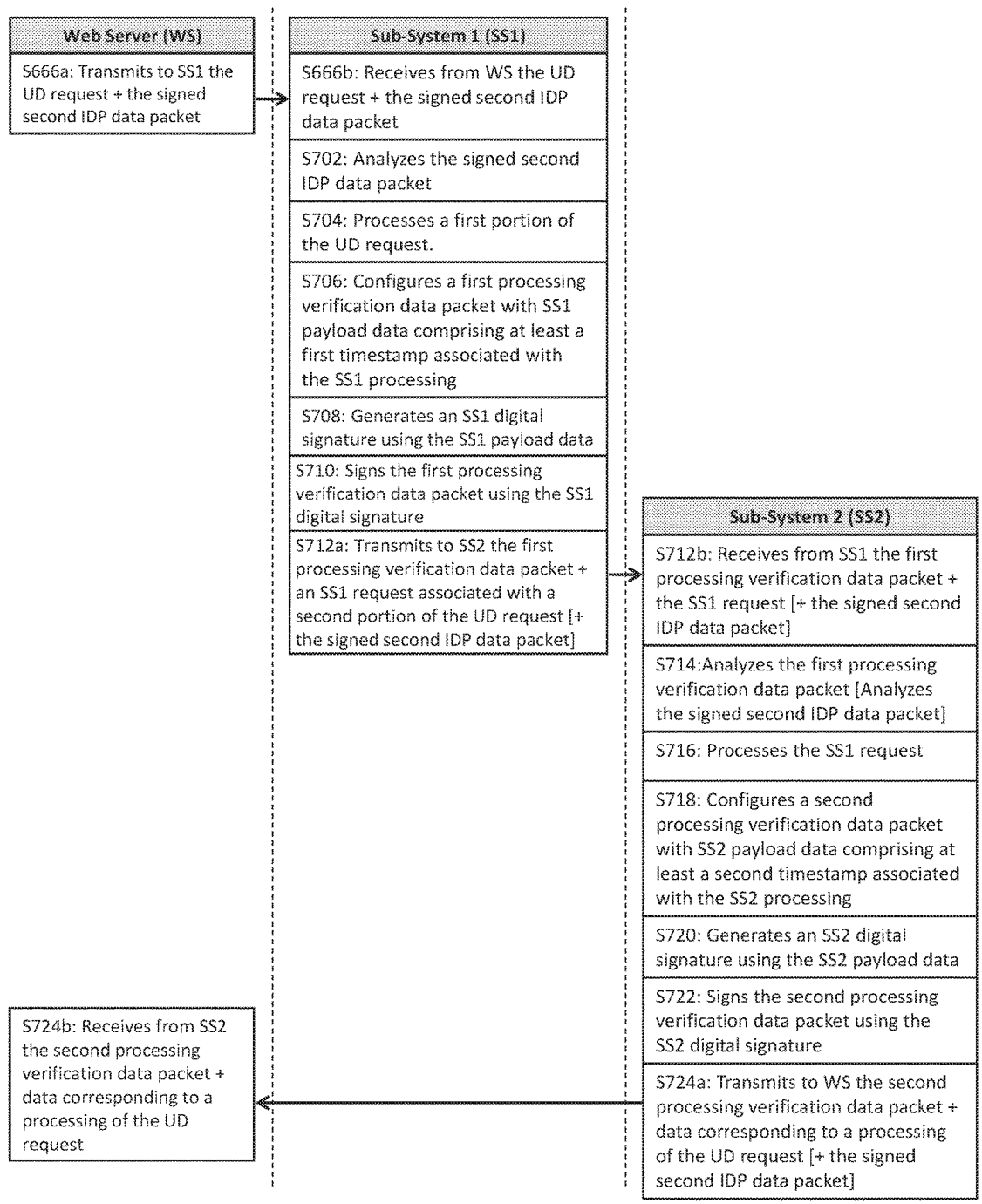
FIG. 7 is a flow chart of an exemplary process for secure system processing in accordance with exemplary embodiments of the present invention.

FIG. 7 is a flow chart of an exemplary process for secure system processing in accordance with exemplary embodiments of the present invention. FIG. 7 illustrates methods for a trust chain of sub-system verifications. In embodiments, the trust chain verification methods using one or more verification data packets, as described herein, may be performed for any processing performed by one or more sub-systems of the distributed computing system, particularly where processing by one sub-system is dependent on data or processes from a second sub-system. A user request may not be a precondition for such methods. In embodiments, automated monitoring processes or processes triggered by events (e.g., transactions performed, data received, data exceeding a threshold, to name a few) may comprise use of the sub-system verification techniques of the present invention.

As described with respect to FIG. 6C, in a step S666a, the web server may transmit to a first processing sub-system (SS1), the electronic user request and the signed second IDP data packet. In embodiments, instead of the user request the web server may transmit a processing request generated by the web server based at least in part upon the electronic user request.

In a step S666b, the first sub-system SS1 may receive from the web server the electronic processing request. The sub-system SS1 may also receive the signed second IDP data packet.

In a step S702, the first sub-system SS1 may analyze the signed second IDP data packet to verify that the request originated from an authorized user, e.g., by checking that the identity provider sub-system verified the user and/or that the user session has not expired. In embodiments, such IDP data packet analysis may have been performed by the web server or another processing sub-system, which may be indicated in a verification data packet received from the web server or from another processing sub-system, and the first sub-system SS1 may not be required to re-analyze the IDP data packet.

In a step S704, the first sub-system SS1 may process at least a first portion of the electronic request (e.g., the user request or a processing request received from a web server based upon the user request). Processing a portion of the request may comprise generating computer-readable instructions, executing such instructions or other instructions stored in memory and/or received by the sub-system, transmitting computer-readable instructions, transmitting electronic requests, fetching data, applying logical programming rules, computing one or more values, and/or comparing values to stored threshold values, to name a few.

In a step S706, the first sub-system SS1 may configure a first processing verification data packet with SS1 payload data. The SS1 payload data may comprise a first timestamp associated with the SS1 processing (e.g., associated with a time at which the SS1 payload is configured and/or a time a which processing by SS1 is completed). The SS1 payload data may comprise data output by the processing of the first sub-system SS1. The first sub-system SS1 may configure the first processing verification data packet automatically following the conclusion of the SS1 processing or in response to an electronic request, e.g., from another sub-system, for processed data.

In a step S708, the first sub-system SS1 may generate an SS1 digital signature. The digital signature may be based upon the SS1 payload data and/or a hash thereof. The first sub-system SS1 may generate the digital signature using its own SS1 private key.

In a step S710, the first sub-system SS1 may sign the first processing verification data packet using the generated SS1 digital signature.

In a step S712a, the first sub-system SS1 may transmit to a second processing sub-system SS2 the first processing verification data packet. In embodiments, the first sub-system SS1 may also generate and transmit an SS1 electronic request, which may be associated with processing a second portion of the initial electronic request (such as the user request or web server request). In embodiments, the first sub-system SS1 may also transmit to SS2 the signed second IDP data packet.

In a step S712b, the second sub-system SS2 may receive the first processing verification packet. It may also receive the SS1 electronic request. In embodiments, it may instead receive a processing request from the web server associated with a second portion of processing. The second sub-system SS2 may also receive from SS1 (or from the web server) the signed second IDP data packet.

In a step S714, the second sub-system SS2 may analyze the first processing verification data packet. Analyzing the verification data packet may comprise verifying the SS1 digital signature using a public key corresponding to the SS1 private key. The second sub-system SS2 may also compare a timestamp in the verification data packet against a current timestamp to ensure that the received data is current and/or responsive to an electronic request currently being processed by the system (e.g., to ensure that the verification data packet is not previously used and now expired). In embodiments, the second sub-system SS2 may also analyze the signed second IDP data packet, e.g., to verify that the user session is not expired and/or that the user is fully authenticated.

In a step S716, the second sub-system SS2 may process the received SS1 electronic request (or a web server request).

In a step S718, the second sub-system SS2 may configure a second processing verification data packet with SS2 payload data. In embodiments, such payload data may include some or all of the information and/or data fields (e.g., with updated values) as contained in the first processing verification data packet. In embodiments, the second processing verification payload data, and the associated data packet, may comprise updated first processing verification payload data, e.g., by appending the updated data to the first payload data and/or by modifying values of data fields, such as with a current timestamp and/or with output data associated with the processing by the second sub-system SS2.

In a step S720, the second sub-system SS2 may generate an SS2 digital signature. The digital signature may be based upon the SS2 payload data and/or a hash thereof. The signature may be generated using an SS2 private key.

In a step S722, the second sub-system SS2 may signed the second processing verification data packet using the generated SS2 digital signature.

In a step S724a, the second sub-system SS2 may transmit to the web server the second processing verification data packet and/or data corresponding to a processing of the electronic request. In embodiments, the verification data packet itself may contain such data from processing the request. In embodiments, the second sub-system SS2 may transmit to the web server the signed second IDP data packet. In embodiments, the verification data packets may ensure a chain of processing by authenticated sub-systems occurred. In embodiments, verification data packets may not be transmitted to the web server and may only be used among processing sub-systems. In other embodiments, each processing sub-system may transmit its own verification data packet to the web server or to other sub-systems requiring data from the sub-system that performed a portion of processing. In embodiments, a single verification data packet may be transmitted among sub-systems and modified by each sub-system that processes a portion of the electronic request that requires authentication.

In a step S724b, the web server may receive from the second sub-system SS2 the second processing verification data packet and/or data corresponding to the processing of the electronic request (e.g., the user request). In embodiments, the web server may receive such processing data and/or verification data packets from each sub-system that performed processing. In embodiments, the web server may receive a single data packet comprising a chain of processing and verification information (e.g., output data from multiple sub-systems and corresponding digital signatures from each sub-system).

Accordingly, a method of authenticating a user and/or a user session may comprise receiving, at a web server of a computing system from a user device, an electronic login request comprising user credentials; transmitting, from the web server to an identity provider sub-system of the computing system, the user credentials for verification based at least in part upon reference user credentials stored in non-transitory computer-readable memory, wherein the identity provider is configured to authenticate user sessions; receiving, at the web server from the identity provider sub-system, a first signed identity provider data packet having a first payload comprising first login credential verification information, a first timestamp, a session identifier, and a first identity provider sub-system digital signature, wherein the first signed identity provider data packet provides an indication that the user session is authenticated and wherein the first identity provider sub-system digital signature is generated by generating a hash of the first payload and encrypting the hash using a first identity provider sub-system private key; generating, by the web server, first display data; transmitting, from the web server to the user device, the first signed identity provider data packet; and transmitting, from the web server to the user device, the first display data.

The method may further comprise receiving, at the web server from the user device, the first signed identity provider data packet; receiving, at the web server from the user device, a user data packet requiring processing by the computing system; transmitting, from the web server to a processing sub-system of the computing system, an electronic request for processing based at least in part upon the user data packet; transmitting, from the web server to a processing sub-system, the first signed identity provider data packet so that the processing sub-system can verify that the user session is authenticated; receiving, at the web server from the processing sub-system, first processed data; transmitting, from the web server to the identity provider sub-system, the first signed identity provider data packet along with an electronic request to update the first signed identity provider data packet; receiving, at the web server from the identity provider sub-system, a second signed identity provider data packet having a second payload comprising the first login credential verification information, a second timestamp, the session identifier, and a second identity provider sub-system digital signature, wherein the second signed identity provider data packet provides an updated indication that the user session remains authenticated and wherein the second identity provider sub-system digital signature is generated by generating a hash of the second payload and encrypting the hash using the first identity provider sub-system private key; generating, by the web server, second display data based at least in part upon the first processed data; transmitting, from the web server to the user device, the second signed identity provider data packet; and transmitting, from the web server to the user device, the second display data.

In embodiments, the first signed identity provider data packet may be an HTTP cookie. In embodiments, the first signed identity provider data packet may encrypted prior to transmission to the user device and/or may be transmitted via an encrypted communication.

In embodiments, the method may further comprise, after receiving the first signed identity provider data packet, the step of verifying, by the web server, the authenticity of the first signed identity provider data packet by decrypting the first signed identity provider data packet using a public key corresponding via asymmetric key cryptography to the identity provider sub-system private key.

In embodiments, the first signed identity provider data packet may be used by the processing sub-system to verify that the user session is authenticated by determining that the user credentials were authenticated and determining, based at least in part upon the first timestamp, that the user session has not timed out.

In embodiments, the first display may data comprise machine-readable instructions to render a graphical user interface for inputting user multi-factor authentication data. In embodiments, the method may further comprise, e.g., prior to receiving a user data packet requiring processing by the computing system, the steps of receiving, at the web server from the user device, user multi-factor authentication data and the first signed identity provider data packet; transmitting, from the web server to the identity provider sub-system, the user multi-factor authentication data; receiving, at the web server from the identity provider sub-system, a third signed identity provider data packet comprising second login credential verification information including multi-factor authentication information, a third timestamp, the session identifier, and a third identity provider sub-system digital signature; generating, by the web server, third display data; transmitting, from the web server to the user device, the third signed identity provider data packet; and transmitting, from the web server to the user device, the third display data.

In embodiments, a method of authenticated computing may comprise receiving, at a first sub-system of a computing system from an origination sub-system, at least a first portion of a first electronic processing request; executing, by the first sub-system, first computing operations to satisfy the first portion of the first electronic processing request to generate a first sub-processing output; configuring, by the first sub-system, a first processing verification data packet comprising a first payload comprising a first timestamp and the first sub-processing output; generating, by the first sub-system, a signed first processing verification data packet by generating a hash of the first payload and encrypting the hash using a first sub-system private key; generating, by the first sub-system, a second electronic processing request associated with a second portion of the first electronic processing request; and transmitting, from the first sub-system to a second sub-system of the computing system, the second electronic processing request along with the signed first processing verification data packet.

The method may further comprise verifying, by the second sub-system, the authenticity of the signed first processing verification data packet by decrypting the signed first processing verification data packet using a public key corresponding via asymmetric key cryptography to the first sub-system private key; executing, by the second sub-system, second computing operations to satisfy the second electronic processing request to generate a second sub-processing output; configuring, by the second sub-system, a second processing verification data packet comprising a second payload comprising a second timestamp, the first sub-processing output, and the second sub-processing output; generating, by the second sub-system, a signed second processing verification data packet by generating a hash of the second payload and encrypting the hash using a second sub-system private key; and transmitting, from the second sub-system to a third sub-system of the computing system, the signed second processing verification data packet.

In embodiments, the origination sub-system may be a web server. In embodiments, the third sub-system may be the origination sub-system.

In embodiments, receiving at least a first portion of a first electronic processing request may further comprise receiving a first signed identity provider data packet, digitally signed using an identify provider private key by an identity provider sub-system that authenticated the user session. In embodiments, the method may further comprise verifying, by the first sub-system, the authenticity of the first signed identity provider data packet by decrypting the first signed identity provider data packet using a public key corresponding via asymmetric key cryptography to the identity provider private key.

In embodiments, the signed second processing verification data packet may comprise respective digital signatures of the first sub-system and the second sub-system. In embodiments, digital signatures from a plurality of sub-systems that processed some of the data in a data packet payload may be appended to that data packet. In embodiments, digital signatures may comprise alphanumeric sequences generated using a respective private key.

In embodiments, a computing system may comprise a web server comprising one or more computers; an identity provider sub-system; and non-transitory computer-readable memory comprising one or more memory devices operatively connected to the web server and to the identity provider sub-system, wherein the system is programmed to authenticate users by: receiving, at a web server of the computing system from a user device, an electronic login request comprising user credentials; transmitting, from the web server to an identity provider sub-system of the computing system, the user credentials for verification based at least in part upon reference user credentials stored in non-transitory computer-readable memory, wherein the identity provider is configured to authenticate user sessions; receiving, at the web server from the identity provider sub-system, a first signed identity provider data packet having a first payload comprising first login credential verification information, a first timestamp, a session identifier, and a first identity provider sub-system digital signature, wherein the first signed identity provider data packet provides an indication that the user session is authenticated and wherein the first identity provider sub-system digital signature is generated by generating a hash of the first payload and encrypting the hash using a first identity provider sub-system private key; generating, by the web server, first display data; transmitting, from the web server to the user device, the first signed identity provider data packet; and transmitting, from the web server to the user device, the first display data.

The system may further be programmed to perform the steps of receiving, at the web server from the user device, the first signed identity provider data packet; receiving, at the web server from the user device, a user data packet requiring processing by the computing system; transmitting, from the web server to a processing sub-system of the computing system, an electronic request for processing based at least in part upon the user data packet; transmitting, from the web server to a processing sub-system, the first signed identity provider data packet so that the processing sub-system can verify that the user session is authenticated; receiving, at the web server from the processing sub-system, first processed data; transmitting, from the web server to the identity provider sub-system, the first signed identity provider data packet along with an electronic request to update the first signed identity provider data packet; receiving, at the web server from the identity provider sub-system, a second signed identity provider data packet having a second payload comprising the first login credential verification information, a second timestamp, the session identifier, and a second identity provider sub-system digital signature, wherein the second signed identity provider data packet provides an updated indication that the user session remains authenticated and wherein the second identity provider sub-system digital signature is generated by generating a hash of the second payload and encrypting the hash using the first identity provider sub-system private key; generating, by the web server, second display data based at least in part upon the first processed data; transmitting, from the web server to the user device, the second signed identity provider data packet; and transmitting, from the web server to the user device, the second display data.

In embodiments, a computing system may comprise one or more processors and non-transitory computer-readable memory having stored thereon instructions to perform the steps of receiving, at a first sub-system of the computing system from an origination sub-system, at least a first portion of a first electronic processing request; executing, by the first sub-system, first computing operations to satisfy the first portion of the first electronic processing request to generate a first sub-processing output; configuring, by the first sub-system, a first processing verification data packet comprising a first payload comprising a first timestamp and the first sub-processing output; generating, by the first sub-system, a signed first processing verification data packet by generating a hash of the first payload and encrypting the hash using a first sub-system private key; generating, by the first sub-system, a second electronic processing request associated with a second portion of the first electronic processing request; and transmitting, from the first sub-system to a second sub-system of the computing system, the second electronic processing request along with the signed first processing verification data packet.

The computer-readable memory may further have stored thereon instructions to perform the steps of verifying, by the second sub-system, the authenticity of the signed first processing verification data packet by decrypting the signed first processing verification data packet using a public key corresponding via asymmetric key cryptography to the first sub-system private key; executing, by the second sub-system, second computing operations to satisfy the second electronic processing request to generate a second sub-processing output; configuring, by the second sub-system, a second processing verification data packet comprising a second payload comprising a second timestamp, the first sub-processing output, and the second sub-processing output; generating, by the second sub-system, a signed second processing verification data packet by generating a hash of the second payload and encrypting the hash using a second sub-system private key; and transmitting, from the second sub-system to a third sub-system of the computing system, the signed second processing verification data packet.

In embodiments, program products may be provided to facilitate the secure authentication operations of the present invention. Accordingly, software and/or software libraries, may be provided for implementation in computing systems, such as distributed computing systems, to perform the processes described herein.

Figure 8A:
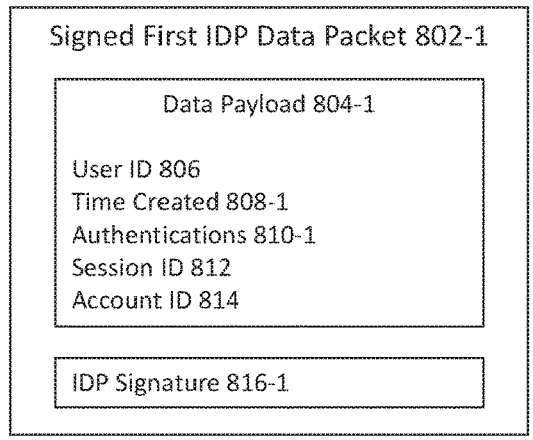
FIGS. 8A-C are schematic diagrams of an exemplary identity provider data packets in accordance with exemplary embodiments of the present invention.
Figure 8B:
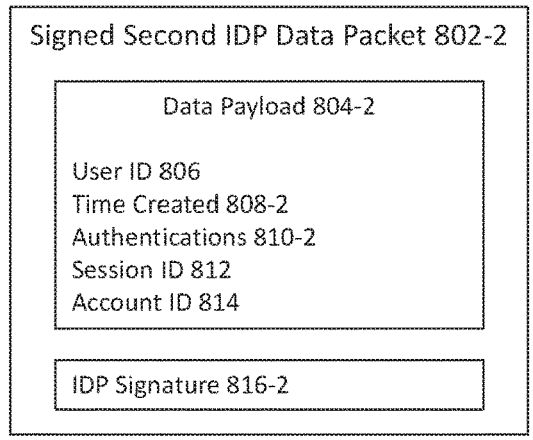
Figure 8C:
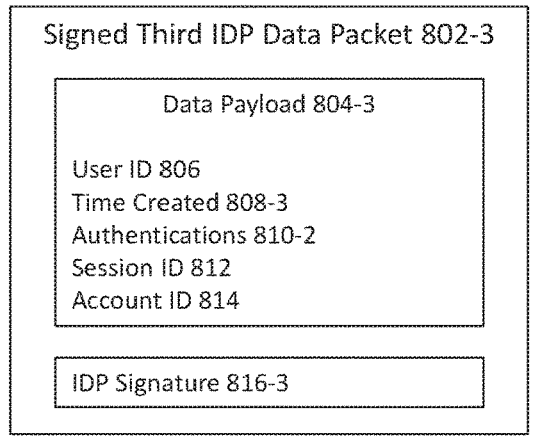

FIGS. 8A-C are schematic diagrams of an exemplary identity provider data packets in accordance with exemplary embodiments of the present invention.

FIG. 8A shows an exemplary signed first IDP data packet 802. The data packet may comprise a first data payload 804-1 and a first IDP digital signature 816-1, which may be based upon the payload data. The first data payload 804-1 can include a user identifier 806, an account identifier 814, and/or a session identifier 812. The first data payload 804-1 may also include time information 808-1 (e.g., a date and time corresponding to the time at which the data payload was configured) and authentication information 810-1, which may indicate the status of user authentication, such as that login credentials have been successfully verified. For example, authentication information 810-1 may indicate the date and time of last password entry and/or the result of a login credential verification process. Data fields for the date and time of last multi-factor authentication may be null or empty, as multi-factor authentication may not yet have occurred.

FIG. 8B shows an exemplary signed second IDP data packet 802-2, which may comprise a second data payload 804-2 and a corresponding second IDP signature 816-2. The second data payload 804-2 may include the same data fields as the first data payload 804-1, except with one or more updated values. For example, the time information 808-2 may be updated. The authentication information 810-2 may also be updated, for example, to include a date and time of last multi-factor authentication credentials received from a user device, a date and time of verification of multi-factor credentials, and/or the status of such verification.

FIG. 8C shows an exemplary signed third IDP data packet 802-3, which may comprise a third data payload 804-3 and a corresponding third IDP signature 816-3. The third data payload 804-3 may include the same data fields as the first or second data payloads, except with one or more updated values. For example, the time information 808-3 may be updated with current time information (e.g., date and time) to indicate that user activity has prolonged the user session duration.

Figure 9A:
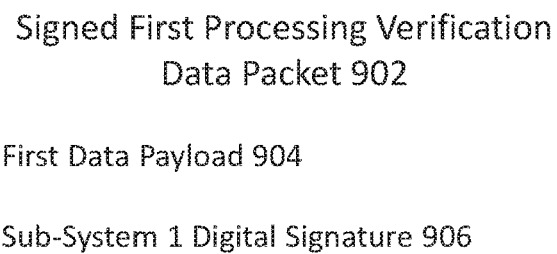
FIGS. 9A-C are schematic diagrams of an exemplary processing verification data packets in accordance with exemplary embodiments of the present invention.
Figure 9B:
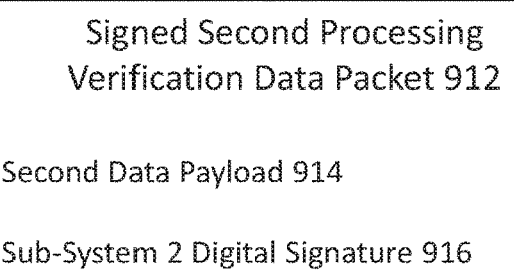
Figure 9C:
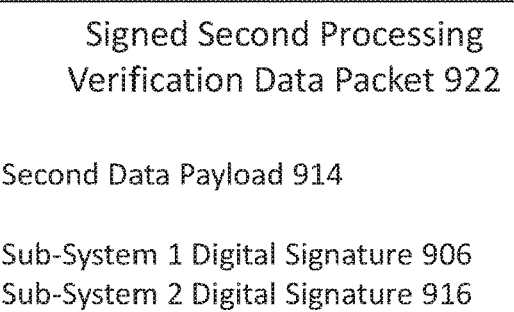

FIGS. 9A-B are schematic diagrams of an exemplary processing verification data packets in accordance with exemplary embodiments of the present invention. FIG. 9A shows an exemplary signed first processing verification data packet 902. The data packet 902 may comprise a first data payload 904 and a sub-system 1 digital signature 906. FIG. 9B shows an exemplary signed second processing verification data packet 912. The data packet 912 may comprise a second data payload 914 and a sub-system 2 digital signature 916. The processing verification data packets of FIGS. 9A and 9B illustrate that each sub-system may generate its own verification data packet. In embodiments, however, a single verification data packet may be transmitted throughout a distributed computing system and modified by sub-systems as they perform processes requiring verification by the other sub-systems (e.g., as dictated by logical rules programmed and stored in non-transitory computer-readable memory). Accordingly, FIG. 9C shows an embodiments of the signed second processing verification data packet 922, which comprises the second data payload 914 and multiple signatures corresponding to the sub-systems that processed data for the data payload. The verification data packet thus includes both a sub-system 1 digital signature 906 and a sub-system 2 digital signature 916.

FIGS. 10A-F are schematic diagrams of an exemplary processing verification data payloads in accordance with exemplary embodiments of the present invention related to a distributed computing system for a digital asset exchange. Exemplary data fields in the data payloads are illustrated. The data fields may be populated and/or updated by one or more processing sub-system of the distributed computing system.

Figure 10A:
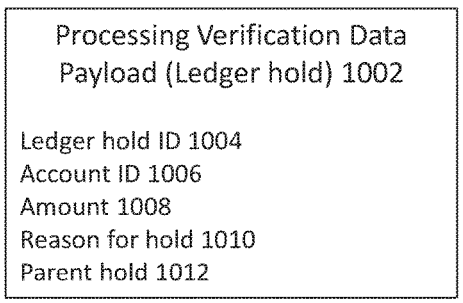
FIGS. 10A-F are schematic diagrams of an exemplary processing verification data payloads in accordance with exemplary embodiments of the present invention.

FIG. 10A shows an exemplary processing verification data payload 1002 corresponding to a ledger hold. A ledger hold may be instituted when a transaction has been requested by a user and is pending execution and/or confirmation. This may ensure that funds to perform the transaction are not double spent. Such a verification data payload may include a ledger hold identifier 1004, an account identifier 1006, and amount to hold 1008, a reason for the hold 1010, and/or a parent hold 1012, which may correspond to a parent account, e.g., an institutional trading account that has multiple sub-accounts.

Figure 10B:
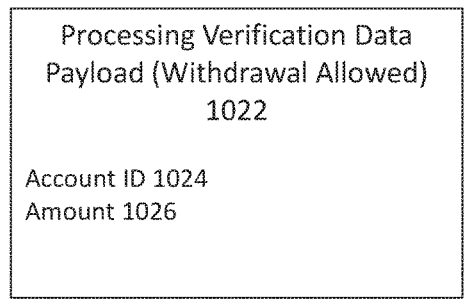

FIG. 10B shows an exemplary processing verification data payload 1022 corresponding to an allowance of a withdrawal of funds. The payload may include an account identifier 1024 and an amount 1026, which may be the amount approved for withdrawal. Such an amount may be expressed in fiat currencies and/or in digital asset quantities.

Figure 10C:

FIG. 10C shows an exemplary processing verification data payload 1032 corresponding to a withdrawal of fiat currency. The payload may include an account identifier 1034, amount withdrawn 1036, and/or bank account identifier 1038 (e.g., to which the funds were transferred), to name a few.

Figure 10D:
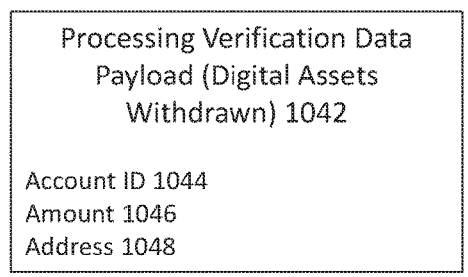

FIG. 10D shows an exemplary processing verification data payload 1042 corresponding to a withdrawal of digital assets. The payload may include an account identifier 1044, amount withdrawn 1046, and/or digital asset address 1048 (e.g., to which the digital assets were transmitted), to name a few.

Figure 10E:
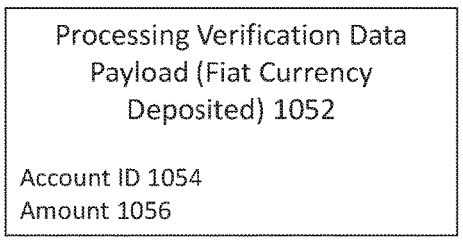

FIG. 10E shows an exemplary processing verification data payload 1052 corresponding to a deposit of fiat currency. The payload may include an account identifier 1054 and/or an amount deposited 1056.

Figure 10F:
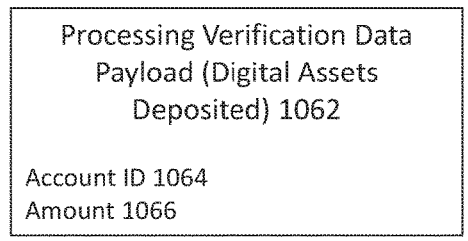

FIG. 10F shows an exemplary processing verification data payload 1062 corresponding to a deposit of digital assets. The payload may include an account identifier 1064 and/or an amount deposited 1066.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

What is claimed is:

1. A system comprising:
(1) one or more processors;
(2) non-transitory computer-readable memory operatively connected to the one or more processors, the non-transitory computer-readable memory having stored thereon machine-readable instructions that, when executed by the one or more processors, cause the one or more processors to perform a method comprising:
 (a) sending, by a user device, an electronic login request to a web server;

(b) receiving, at the user device, first display data from the web server in response to the login request;
(c) displaying, at the user device, the first display data;
(d) receiving, at the user device, credential information associated with a user of the user device provided in response to the first display data;
(e) transmitting, from the user device, the credential information to the web server;
(f) receiving, from the web server, second display data and a first signed identity provider data packet including a first payload comprising first login credential verification information, a first timestamp, a session identifier, and a first identity provider sub-system digital signature, wherein the first signed identity provider data packet provides an indication that a user session is authenticated and is signed with a first identity provider sub-system digital signature that is generated by generating a hash of the first payload and encrypting the hash of the first payload using a first identity provider sub-system private key;
(g) displaying, at the user device, the second display data;
(h) storing, at the user device, the first signed identity provider data packet;
(i) providing, at the user device, user data associated with the user after display of the second display data;
(j) transmitting, to the web server, the user data and the first signed identity provider data packet;
(k) receiving, from the web server, a second signed identity provider data packet including a second payload comprising a current time stamp, authentication verification information, user identification information and session identification information and third display data, where the authentication verification information is provided from a first sub-system and is signed with a second identity provider sub-system digital signature that is generated by generating a hash of the second payload and encrypting the hash of the second payload using the first identity provider sub-system private key;
(l) displaying, at the user device, the third display data; and
(m) storing, at the user device, the second signed identity provider data packet.

2. The system of claim 1, where the step of sending an electronic login request comprises:
(i) navigating, using the user device, to a URL; and
(ii) selecting, using the user device, a login user interface.

3. The system of claim 1, wherein the first display data comprises machine-readable instructions to render a graphical user interface for inputting the credential information.

4. The system of claim 1, wherein the credential information comprises a username and password associated with the user of the user device.

5. The system of claim 1, wherein the second display data comprises machine-readable instructions to render a webpage.

6. The system of claim 1, wherein the user data is multi-factor authentication data associated with the user of the user device.

7. The system of claim 1, wherein the third display data comprises machine-readable instructions to render content of a distributed computer system to which the web server is connected and access to which is dependent on authentication of the user using the user data.

8. The system of claim 1, further comprising steps of:
(n) transmitting, from the user device, an electronic user request and the second signed identity provider data packet;
(o) receiving, from the web server, fourth display data and a third signed identity provider data packet including a third payload comprising a second current time stamp, a session identifier, user identifier and verification information;
(p) rendering, at the user device, a display based on the fourth display data; and
(q) storing, at the user device, the third signed identity provider data packet.

\* \* \* \* \*